United States Patent [19]
Mansour et al.

[11] Patent Number: 6,149,765
[45] Date of Patent: *Nov. 21, 2000

[54] PROCESS FOR DETOXIFYING WASTE MATERIALS BY STEAM REFORMATION THROUGH ENDOTHERMIC GASIFICATION REACTIONS

[75] Inventors: Momtaz Nosshi Mansour, Columbia, Md.; Kanda-Swamy Durai-Swamy, Torrence; David Walter Warren, Sherman Oaks, both of Calif.

[73] Assignee: Manufacturing & Technology Conversion International, Inc.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/747,581

[22] Filed: Nov. 12, 1996

Related U.S. Application Data

[63] Continuation of application No. 08/439,456, May 11, 1995, Pat. No. 5,637,192, which is a continuation of application No. 08/055,674, Apr. 29, 1993, abandoned, which is a continuation of application No. 07/723,936, Jul. 1, 1991, abandoned, which is a division of application No. 07/310,202, Feb. 14, 1989, Pat. No. 5,059,404.

[51] Int. Cl.[7] ........................................ A62D 3/00
[52] U.S. Cl. ..................... 162/29; 588/214; 588/241; 588/242; 423/201; 48/1
[58] Field of Search ................. 162/29, 82, 30.1, 162/30.11, 15, 47; 422/139, 146, 224; 423/207, 659, DIG. 16, DIG. 3; 431/1, 2; 48/197 R, 73, 202, 209, 77, 111, 62 R; 588/242, 240, 241, 213, 214

[56] References Cited

U.S. PATENT DOCUMENTS

| | | | |
|---|---|---|---|
| 3,607,619 | 9/1971 | Hess | 162/30.11 |
| 4,439,272 | 3/1984 | Nguyen | 162/30.11 |
| 5,637,192 | 6/1997 | Mansour et al. | 162/29 |

*Primary Examiner*—Steve Alvo
*Attorney, Agent, or Firm*—Dority & Manning, P.A.

[57] ABSTRACT

Resonant tubes of a pulse combustor are immersed in a bed of solid particles in a reaction zone to provide indirect heat from the pulsating combustion gases to the solid particles of the bed. The bed is maintained in an agitated state by a gas or vapor flowing through the bed. Reactant materials are introduced into the agitated bed and undergo reaction at enhanced rates resulting from heat transfer coefficients at least about twice as high as those of steady flow combustors and an intense acoustic pressure level propagated from the pulsating combustor into the reaction zone. The apparatus is useful, for example, to steam reform heavy hydrocarbons and to gasify carbonaceous material, including biomass and black liquor to produce combustible gas at relatively low temperatures, with steam being utilized as the bed fluidizing medium. Black liquor gasification, utilizing sodium carbonate as bed solids, results in liquor energy and chemical content recovery without smelt production.

9 Claims, 5 Drawing Sheets

PROCESS FOR DETOXIFYING WASTE MATERIALS BY STEAM REFORMATION THROUGH ENDOTHERMIC GASIFICATION REACTIONS

This is a continuation, of application Ser. No. 08/439,456 filed May 11, 1995 U.S. Pat. No. 5,637,192 which is a continuation of application Ser. No. 08/055,674 filed on Apr. 29, 1993, now abandoned; which is a continuation of Ser. No. 07/723,936 filed on Jul. 1, 1991, now abandoned; which is a division application of Ser. No. 07/310,202 filed on Feb. 14, 1989, now U.S. Pat. No. 5,059,404.

FIELD OF THE INVENTION

This invention relates to indirectly heated thermochemical reactors and processes for performing thermochemical reactions, including, such as, gasification and steam reforming of heavy oils and toxic organics, black liquor recovery, and energy recovery and conversion of renewable resources, such as biomass and energy-bearing waste streams.

BACKGROUND OF THE INVENTION

Processes for performing thermochemical reactions encompass a wide spectrum of reactions in which feedstocks are directly or indirectly heated to effect desirable endothermic reactions.

In the case of directly heated reactors, exothermic reactions effected in-situ provide the heat of reaction for the desired endothermic processes. Examples of such directly heated systems include partial oxidation and autothermal gasifiers. Although these systems can be used to gasify, for example, carbonaceous material, including biomass, the product gas is of low quality due to the presence of diluents, i.e., the products of the exothermic reactions.

Higher quality products can be obtained by the use of indirectly heated reactors. For example, several methods have been used for indirectly heated biomass gasification. One approach employs a conventional combustor with fire tubes immersed in a fluid-bed reactor. Flanigan et al., Proceedings of the 15th Biomass Thermochemical Conversion Contractor's Meeting, Atlanta, Georgia, pp. 14–30 (1983). A second approach employs an auxiliary fluid-bed char combustor that heats sand in a separate bed. The hot sand is then used as the heat delivery medium in the primary fluid-bed gasification reactor. Feldman et al., Proceedings of the 15th Biomass Thermochemical Conversion Contractor's Meeting, Atlanta, Georgia, pp. 31–90 (1983).

In the first approach, the large size of the combustor and heat exchange subsystem results in high cost relative to directly heated reactors. The major disadvantages of conventional fire tube, indirectly heated reactors has always been the high cost arising from the size of the heat exchangers and the high-temperature materials required for construction of such heat exchangers. In addition, the large number of tubes required for heat exchange compromise the reactor bed fluidization. Thus, low heat release rates in the combustor and low heat transfer rates in the fire tubes limit the reactor's performance and economic viability.

In the second approach, char combustion to recoup the heating value of the char is difficult to achieve without long residence time and excess air, requiring an even larger (than the gasifier) combustor and further decreasing system efficiency. In addition, the size and complexity of the hot sand recirculation equipment and the cost of the additional fluid-bed char combustor both represent serious shortcomings.

As another example, prior art in steam reforming of heavy liquid hydrocarbons involves a number of fixed-bed and fluid-bed methods plagued by serious operational problems.

Most steam reformers for processing heavy liquid hydrocarbons to produce hydrogen-rich gas are autothermal, operating at high temperatures. This, however, compromises the produce gas quality, due to the release of diluents (products of combustion in the product gas), particularly if the system is air blown.

This led to the development of two indirectly heated steam reformers worthy of note, one being the Total Hydrocarbon Reforming (THR) process (Tomita, High Temperature Processing Symposium, sponsored by KTI Company, Santa Barbara, Calif. (1979); Tomita et al., European Meeting of Chemical Engineering, 18th Chemical Congress and Exhibition, Frankfurt Germany (1976)), the other being a catalytic fluidized steam-reforming process ((hereinafter the "French process)" Bulletin from Societe de al Grande Paroisse, (1973)).

In the THR process, hydrogen is produced by the reaction of steam with the heavy liquid hydrocarbon in a fixed-bed tubular reactor. This process is catalytic and is reported to accept a range of feedstocks including naphtha and crude oil without any feedstock pretreatment. The THR process employs a catalyst which operates in the presence of sulfur.

The primary catalyst is called T-12 and is a silica-free, calcium aluminate based catalyst. Because the steam reforming activity of this catalyst is lower than that of conventional nickel catalysts, the required reaction temperature is higher. Thus, for a heavy feedstock such as Iranian heavy crude, inlet temperatures are on the order of 1652° F. and exit temperatures as high as 1832° F., giving rise to serious heat transfer and tube material problems. It should also be noted that it was necessary to develop a complex new feed system to control the heavy fuel vaporization and vigorous mixing with steam to avoid cracking and soot formation at the reformer tube inlet.

Because the Ni-free T-12 catalyst is not sufficiently active to convert all the hydrocarbons to synthesis gas, the exit gas inevitably contains a high level of methane, particularly with heavy feedstocks. To solve this problem of hydrocarbon breakthrough, a Ni-containing catalyst (T-48) is used at the end of the T-12 calcium aluminate fixed-bed. The T-48 nickel catalyst, which is adjacent and upstream from the T-12 catalyst, is sulfur tolerant in this process because it is operated at high temperatures, usually 1650° F., and in the presence of substantial amounts of $H_2$. For steam reforming of crude oil, the THR process is more costly than conventional naphtha steam reforming.

It is apparent to those familiar with the steam reforming art that processing of heavy hydrocarbons poses unique problems due to the existence of aromatic constituents contained within the heavy hydrocarbons which are particularly prone to forming carbonaceous deposits or soot on catalytic substrates. In the THR process, the primary catalyst is disposed within a fixed bed tubular reactor. The deposition of carbonaceous deposits in such fixed bed tubular reactors results in occlusion of the catalyst void volumes. In the fixed bed configuration, the process of deposition and occlusion is progressive, leading to excessive pressure drop within the tubular reactor and necessitating shutdown. Thus, since deposit formation cannot be tolerated in fixed bed reactors, process conditions must be established to avoid or minimize its occurrence. This generally requires the use of high steam to carbon ratios which enhances the rate of carbon gasification relative to the rate of carbonaceous deposit formulation. However, high steam to carbon ratios are detrimental to the thermal efficiency of the process.

In the case of the French process, developed at the Societe de la Grande Paroisse, a fluid-bed reactor was employed.

The reactor was developed to process heavy, sulfur-containing feedstocks (e.g., fuel oil) to hydrogen with no desulfurization and minimum carbon formation. In this process, water and hydrocarbon are fed into a fluidized-bed of nickel-containing catalyst which is maintained isothermally at 1472–1690° F. The fluidized bed operation permits operation at low steam/carbon ratios. However, the heavier feedstocks cause some hydrocarbon breakthrough. Moreover, having a nickel-containing catalyst in the fluid-bed process is not desirable for two reasons. The first reason is that attrition in the bed causes loss of the expensive nickel-containing catalyst. The second reason is extensive soot formation and sulfur poisoning of the nickel in the catalyst, which is encountered when processing heavy liquids which are soot formation prone and contain a significant amount of sulfur (Number 4 and 6 fuel oils).

In addition, certain reactant materials present unique challenges to reactor, process, and system design. Black liquor, the by-product of pulping processes, generally contains biomass-derived lignins and inorganic sodium and, in some instances such as in the case of the Kraft liquor, sulfur process chemicals. The economics of the process dictate the need for recovering the process chemicals and energy values of the black liquor.

The Kraft black liquor recovery process, for example, must provide a means for conserving and/or regenerating sulfur in the sodium sulfide form. This is currently being accomplished using a Tomlinson recovery furnace, wherein black liquor is combusted and the inorganic sulfate chemicals are reduced by reaction with carbon in a molten smelt bed at the bottom of the furnace. Although the Tomlinson furnace has been widely employed in the Kraft paper industry for several decades, it possesses significant deficiencies, including safety hazards, i.e., smelt-water explosions, corrosion and undesirable environmental emissions. In addition, Tomlinson furnaces represent a significant fraction of the total capital expenditure for a modern mill. When mill expansions are contemplated, there exists little opportunity for incremental plant capacity expansion because recovery boilers are economically viable only in large capacities.

For these reasons, the paper industry has sought new technology alternatives to the Tomlinson recovery boilers. Gasification of black liquor can be accomplished autothermally; however, this approach results in product gas of low heating value and in most instances, such autothermal gasifiers produce molten smelt. More importantly, since the Kraft chemicals must be recovered in a reduced state, direct exposure of black liquor to oxidants, e.g., in partial oxidation and autothermal processes is generally undesirable. Others have demonstrated autothermal gasification of black liquor in a molten salt reactor. Although reduction of Kraft chemicals by carbon contained in the molten salt has been established in an autothermal gasifier, this route suffers from many of the same difficulties which plague the Tomlinson furnace technology, including smelt production, corrosion problems, explosion hazard, high capital cost, and low system efficiency.

Thus, there is a need for a black liquor recovery process that obviates the need for molten smelt handling, provides high reliability and safety, high thermal efficiency, low cost and is amenable to modular system configurations to support incremental mill expansion.

For a variety of applications, there is a need for both new reactor technology for indirectly heated thermochemical processes, and for the various endothermic processes, optimization of the reactions and process parameters to maximize the benefits. Needs for new indirectly heated thermochemical reactor technology and processes exist in a very wide spectrum of end-use applications, including, e.g., mild gasification of coal, steam gasification of coal and peat, thermal cracking of chemicals, industrial and municipal waste thermochemical processing, gasification of energy-bearing waste streams from food processing plants, recovery of useful fuel forms from oil shale and oil and tar sands, detoxification of and energy recovery from hazardous waste materials, and generally effecting endothermic reactions in chemical processes for production of desired chemicals.

Advantages may be gained in heat release and heat transfer rates by the utilization of pulsating combustors. The combustion intensity of pulse combustors is high. Thus, for a given heat output, the combustion chamber is relatively small. Further, because the combustion products are driven by combustion-induced oscillations, the boundary layer resistance to heat transfer, from the flue gas to the inner wall of the fire tube (resonance tube), is reduced and the heat exchange surfaces may be correspondingly smaller for a specific output. For example, U.S. Pat. No. 4,655,146 refers to a reactor for performing high temperature reactions such as melting, heat treating and incineration. The reactor comprises a combustion chamber, or extension thereof, tuned to resonate and thereby achieve efficient combustion. Fuel and the reaction material are fed into and undergo reaction within the chamber. U.S. Pat. No. 3,606,867 refers to a pulsating combustion system for producing a high temperature and pressure gas stream to impinge on objects for heat treatment. U.S. Pat. No. 2,937,500 refers to resonant jet engines in combination with heat exchange equipment, which equipment is characterized by a sonically augmented rate of heat transfer for use in heating the air supply to the engine. These patents are incorporated herein by way of reference. None of these patents or any of the aforementioned thermochemical processes suggest the use of pulsating combustion in connection with an indirectly heated fluid bed reactor.

The present invention overcomes the deficiencies of the currently used indirectly heated reactors by utilizing a single or, preferably, multiple resonant tube(s) of a pulsating combustor emanating from the same combustion chamber as the in-bed heat exchanger, wherein the velocity and pressure oscillations of the combustion gases and the intense acoustic field radiated by the multiple resonance tubes into the reactor bed enhance rates of heat release, heat and mass transfer and, ultimately, the rates of reaction in the bed.

SUMMARY OF THE INVENTION

It is an object of this invention to provide thermochemical reactors characterized by high thermal efficiency, high processing rates, low capital and maintenance cost and high product quality for end-use applications, including:

Black liquor gasification

Biomass gasification

Steam reforming of heavy liquid hydrocarbons

Indirect drying

Mild gasification (moderate temperature pyrolysis) of coal

Steam gasification of coal and peat

Industrial and municipal waste indirectly heated thermochemical processing

Thermal cracking of chemicals

Gasification of energy-bearing waste streams from food processing plants

Recovery of useful fuel forms from oil shale and oil and tar sands

Detoxification of and energy recovery from hazardous waste materials

Effecting endothermic reactions in chemical processes for production of desired chemicals It is another object of this invention to provide a thermochemical indirectly heated reactor apparatus and method for enhancing rates of heat release, heat and mass transfer, reaction rates and throughput for producing useful products and detoxification of materials with low levels of environmental intrusion.

It is another object of this invention to provide improved thermochemical processes for end-use purposes, including:

Black liquor recovery

Catalytic steam reforming of heavy liquid hydrocarbons

Catalytic steam gasification of low-rank coals

Mild gasification of coal

Recovery of useful fuel forms from oil shale and oil and tar sands

It is another object of this invention to generate medium Btu gas of about 350 to 550 Btu/scf and hydrocarbon liquids from alternative energy sources such as coal, oil shale, biomass, municipal solid waste, energy bearing industrial waste, and waste hydrocarbons with negligible production of undesirable tars and heavy oils.

It is also an object of this invention to provide an apparatus and method for gasifying black liquor and recovering its energy and chemical values, without molten smelt production.

Another object is to provide a modular black liquor recovery system and process well-suited for incremental mill capacity expansion.

Additional objects and advantages of the invention will be set forth in part in the description which follows, and in part will be obvious from the description, or may be learned by practice of the invention. The objects and advantages of the invention will be attained by means of the instrumentalities and combinations particularly pointed out in the appended claims.

To achieve the objects and accordance with the purpose of the invention, as embodied and broadly described herein, the present invention comprises an indirectly heated thermochemical reactor apparatus including a fluid-bed reactor which is indirectly heated by a pulse combustor having a combustion chamber, an aerodynamic valve, and single or multiple elongated conduits bounding a resonance zone, having an inlet at the combustion chamber at one end thereof and an outlet at the other end, hereinafter called "resonance tube(s)." The fluid-bed reactor is provided with one or more material introduction ports and is charged with solid particles comprising a suitable bed material which may be inert or may be of catalytic nature providing catalytic enhancement of reactions within the bed. The fluid-bed reactor is also provided with a port near the bottom of the reactor for introduction of a fluidization medium which may be steam, gas, evaporated liquids other than steam or a combination thereof. The flow of the fluidization medium within the fluid-bed reactor is distributed in a manner which is substantially uniform over the cross-section of the bed by distribution means for uniform distribution of the fluidization medium. At the exit of each resonance tube, an exit plenum is provided to collect gases exiting the resonance tubes. Solid material, gases and vapors, hereinafter called "reactor products," exit the fluid-bed reactor through a separate port. The reactor products then enter a particulate matter separation means such as a cyclone or baghouse or other suitable means for separation of solids from the reactor products.

The operation of the apparatus of the invention involves introducing a fuel and an oxygen-containing gas into a combustion chamber and combusting a first part of the fuel introduced into the combustion chamber under conditions effecting pulse combustion thus producing a hot gaseous stream comprising a remaining part of the fuel introduced into the combustion chamber, the pulse combustion being operable to produce velocity oscillations of at least about 20 Hz in frequency and acoustic dynamic pressure levels of at least about 165 dB. The hot gaseous stream from the combustion chamber is then discharged into an inlet of an elongated resonance zone bounded by a conduit wall having an inlet at one end thereof and an outlet at the other. The remaining part of the fuel in the hot gaseous stream is combusted in the resonance zone thereby further producing heat in a combustion product stream. Heat is transferred from the combustion product stream through the conduit wall surrounding the resonance zone into a bed of solid particles confined in a reaction zone. A fluidizing liquid vapor or gas is injected into and through the reaction zone through a port at a rate operable for maintaining the solid particles in an agitated state. The solid particles in the reaction zone are heated by heat transfer from the combustion product stream in the resonance zone, without direct contact between the combustion product stream and the particles, such that the overall rate of heat transfer from the combustion product stream to the particles is at least about twice as high as that which would be achieved in the absence of pulse combustion.

A reactant material is introduced into the reaction zone through one or more ports, mixed with the heated solid particles and fluidizing medium of the bed, and, thus undergoes endothermic reaction or physical change in the bed and is processed to yield useful products. The intense acoustic field radiated into the bed of solid particles in the reaction zone, from the resonance tubes, enhances mixing in the bed and reactant materials charged thereto and increases rates of particle-to-gas and particle-to-vapor mass transport and reactions in the bed, thereby overcoming reaction diffusion limitations and enhancing the effectiveness of reaction kinetics resulting in high process throughput rates.

Pulsations in the flow of combustion gases through the resonance tubes impart vigorous mass transfer within the boundary film layer at the interface between the hot combustion gases and the inner conduit wall, thereby eliminating a major cause of heat transfer resistance. The heat transfer rates between the outer wall of the resonance tubes and the material in the reaction zone (fluid-bed-) are generally high. The indirectly heated system of this invention has a heat transfer coefficient which is higher by a factor of about 2 to about 10 times the heat transfer coefficients of conventional systems. As a consequence, the size and number of the resonating heat transfer tubes of this invention are relatively small when compared to the size and number of heat exchangers in fire-tube conventional indirectly heated systems.

The combustor is also compact due to efficient combustion and high volumetric heat release rate. The pulse combustor of the apparatus of this invention has a heat release rate of about 4,000,000 to about 6,000,000 Btu/ft$^3$/hr or higher, as compared to a heat release rate of 40,000 to 400,000 Btu/ft$^3$/hr for conventional combustors. In the preferred embodiment of this invention, the pulse combustor has an aerodynamic valve for self-regulation of the fuel to air ratio within the combustor's firing range and produces heat at about 4,000,000 Btu/hr/ft$^3$, combustion product gas temperature of about 3000° F., gas velocity in the resonance tube of at least about 300 ft/sec with oscillations of at least 165 dB and at least 20 Hz, and radiates an acoustic pressure level of at least about 140–150 dB (as measured in the reaction zone). As a result of the intense acoustic field, many reactions occur in the reactor of the invention at reaction zone temperatures 100 to 200° F. lower than in conventional systems.

This invention also employs pulse combustion advantageously to achieve complete combustion of hard to burn fuels, including, for example, coal and biomass chars. The fluctuating flow field causes the products of combustion to be swept away from the burning, non-gaseous fuel, thus providing access to oxygen. Diffusion limitations in the pulse combustor and resonance tube are essentially eliminated, reducing the need for excess air.

A wide range of reactors and bed materials can be used in this invention. In the preferred embodiments of this invention, a fluidized bed reactor or entrained bed reactor, and a fluidizing or carrier gas is used. The reactor of this invention can be used for heating a wide variety of inorganic or organic materials, including, for example, sand, coal ash, salts, organic solvents, waste oils, hazardous waste, coal, biomass, tar sands, oil shale, solid wastes and slurries such as sewage sludge and black liquor, and various solid catalysts.

According to a particularly preferred embodiment of this invention, steam gasification of black liquor is effected with no process air or oxygen and, thus, strictly endothermic reactions occur in the bed. The process of this invention enables black liquor recovery without formation of molten smelt.

In this preferred embodiment, black liquor, of concentration between about 50 to 75 percent solids, is steam atomized or sprayed directly onto hot bed solids in the reaction zone of the reactor. The black liquor forms a relatively thin coating on the surface of the solid particles and is pyrolyzed at a very high rate. This provides a high surface area and porosity for the rapidly pyrolyzing black liquor coating, sufficient for completing steam gasification, sodium sulfates reduction to sodium sulfides in the reactor's reducing environment and release of sulfur-containing hydrocarbons found in the liquor in the form of hydrogen sulfide, with essentially all the sodium in the black liquor reacted to form sodium carbonate, without molten smelt formation. The preferred bed material for this embodiment, which material is initially charged in the reaction zone, is sodium carbonate (soda ash). In this embodiment, the preferred temperature for the reaction zone is 1100° F. to 1250° F. with the in-bed heater element surface maintained below a maximum temperature of about 1300° F. to 1350° F. This is essential to prevent softening or melting of the sodium carbonate found in the bed which would lead to bed agglomeration and formation of undesirable molten smelt.

To recover the sulfur that is released from the reaction zone with the product gas, the recovered sodium compounds, which are in the form of sodium carbonate with a small amount of char, are dissolved in water to form an alkaline sodium carbonate solution which is used to scrub the product gas, thus recovering the sulfur and forming green liquor. The green liquor is further processed in the usual manner to provide sodium hydroxide and sulfide (white liquor) for the Kraft pulping process. Traces of hydrogen sulfide which may be present in the product gas after scrubbing the gas with the sodium carbonate solution can be further removed by scrubbing the gas one more time with sodium hydroxide if necessary.

According to another particularly preferred embodiment, the reaction zone contains a bed of sand or calcium carbonate, fluidized with steam. Biomass is injected into the lower portion of the fluid bed. A pulse combustor is fired with fuel injected into a combustion chamber below the bed. Resonant tubes carry the combustion gases through the bed, providing an intense acoustic field and heat for endothermic gasification reactions which take place in the fluid bed.

The biomass gasification apparatus and process results in high quality product gas of approximately 525 Btu/ft$^3$ in heating value. Tar and char production levels resulting from the pulse combustor integrated gasifier are much lower than those obtained by other systems, thus indicating higher carbon to product gas conversion and process efficiency at moderate reactor temperatures (approximately 1200° F.). The biomass gasification embodiment demonstrates enhanced heat transfer coefficients of at least four times the coefficients of the best of conventional indirectly heated gasification systems. In addition, the intense acoustic field enhances the near-field biomass particle mass transfer and overall reaction rates in the bed. Reduction in reactor temperature, while maintaining the quality of the product gas, impacts on the materials and cost requirements of the reactor, particularly if modest pressurization is used to capitalize on the higher reaction rates to further increase throughput.

In another preferred embodiment of this invention, a heavy liquid hydrocarbon fuel including, for example, No. 2 fuel oil, logistic military diesel and jet engine fuels, No. 4 fuel oil, and residual fuel oils such as No. 6 and bunker C fuel, and steam are injected into the reaction zone containing a bed of solid calcium aluminate based catalyst or any other sulfur poisoning tolerant steam activating and carbon gasification promoting catalyst.

The preferred bed temperature for the hydrocarbon steam-reforming reactor is in the range of 1600° F. to 1800° F. The heavy liquid hydrocarbon fuel is atomized directly on the hot catalytic bed particles, which are fluidized by steam injected near the bottom of the bed. The hydrocarbon fuel coats the surface of the hot particles in the bed and vaporizes very rapidly, thus providing little to no opportunity for cracking and soot formation. The catalyst present in the bed activates the steam which reacts with the hydrocarbon vapor at the elevated bed temperature, rapidly steam reforming the fuel and giving rise to a hydrogen-rich gas containing methane, carbon monoxide, carbon dioxide, and a small amount of higher hydrocarbons. The product gas also contains essentially all the sulfur content of the fuel in the form of H$_2$S. The product gas, containing light species, is then scrubbed to remove the hydrogen sulfide and further processed in a conventional, second-stage fixed bed (plug flow) steam reformer to steam reform the methane and trace higher hydrocarbons to maximize hydrogen yield. Alternatively, the product gas can be scrubbed of hydrogen sulfide and used as a high-quality hydrogen rich gas for firing combined cycle and combustion gas turbines. In this alternative, inferior fuels can be used as feed to both the reaction zone and the combustion zone thus enabling the use of lower cost fuels for operating combustion gas turbines and combined cycle gas turbine systems.

In this embodiment of the invention, a number of serious cost and operational problems found in the THR reformer are alleviated. In this embodiment, the fuel is atomized directly on the hot fluid-bed material with vigorous mixing in the fluid bed and high rates of fuel vaporization and immediate reactions with the activated steam fluidizing the catalyst bed. Therefore, no special equipment is required to feed and properly mix and vaporize the heavy feedstocks, as is the case of the THR fixed-bed reactor. In addition, the heat transfer between the in-bed heater and the fluid bed of this invention and within the fluid bed itself is very high. This causes a reduction in equipment size and material cost by a factor of about 2.5 to 3 in capital cost reduction.

System reliability is also much more enhanced by this invention over the THR system. In the case of the THR fixed-bed reformer, should feedstock vaporization and proper mixing be impaired due to operational problems at the inlet of the fixed-bed reformer tube, particularly with heavy feedstock, soot will form and lay down on the catalyst in the fixed bed. This in turn leads to more residence time for the fuel, without availability of active catalyst surface near the inlet of the tube (due to soot laydown), at high temperature which causes the fuel to be steam cracked, forming more soot. This failure mode diverges with progressively more soot forming downstream of the tube inlet and ultimately plugging the fixed-bed tubes.

In this embodiment of the invention, small amounts of soot which may be formed do not lead to divergent failure of the process. Due to the agitated state in the fluid bed, bed material moves constantly within the bed and soot-laden catalyst particles ultimately move near the distributor means which causes the local steam-to-carbon stoichiometry to be very high. The incoming steam gasifies the soot, producing synthesis gas without operational problems. Even in the event of very excessive soot formation, the fuel flow may be temporarily reduced, while the steam injection rate is maintained and, thus, all the soot in the bed is steam gasified without halting gas production of the system, or the fluid bed can be drained and simultaneously replenished with fresh catalyst charge during operation, an option not available in the THR fixed-bed reformer case.

Thus, the first-stage fluid-bed of this embodiment of the invention is a reliable, more operationally robust and efficient stage for processing the heavy liquid fuel into lighter species that can be scrubbed from hydrogen sulfide if necessary and further steam reformed in a fixed-bed second stage in the conventional manner, where the second-stage catalyst can contain nickel. This is simply due to the fact that the second-stage fixed-bed has plug gas flow. In the French single-stage fluid bed, the characteristic mixing in fluid beds and hydrocarbon breakthrough compromise the reactor performance. In this embodiment of the invention, the second-stage is only exposed to lighter hydrocarbons and little to no sulfur together with significant hydrogen partial pressure (45% to 65% by volume), thus allowing the use of nickel in the catalyst for efficient steam reforming of lighter hydrocarbon species that break through the fluid-bed reactor, at reasonable second-stage reactor temperatures.

DETAILED DESCRIPTION OF THE INVENTION

Reference will now be made in detail to the presently preferred embodiments of the invention, which, together with the following examples, serve to explain the principles of the invention.

Figure 1:
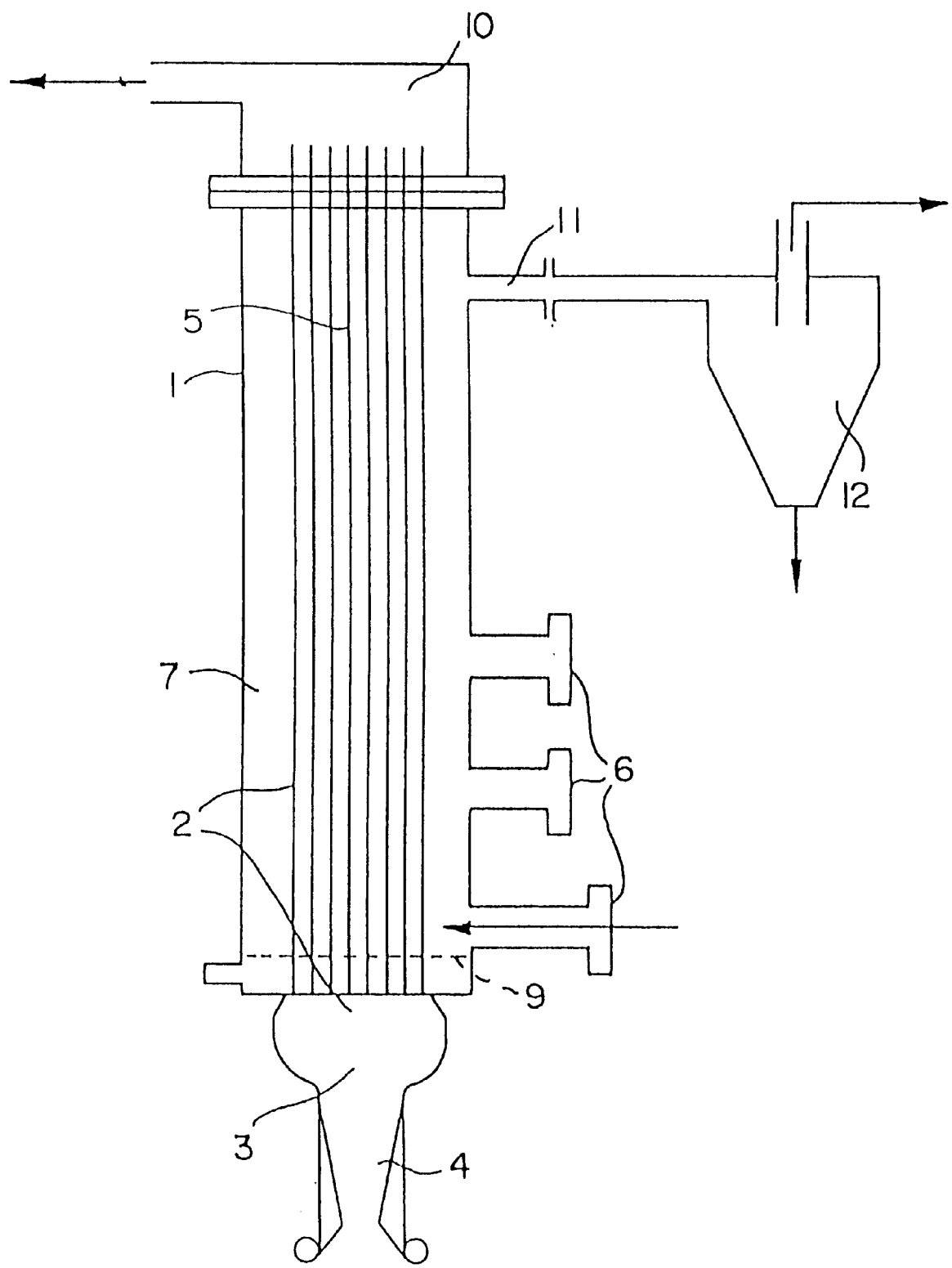
FIG. 1 depicts the indirectly heated thermochemical reactor apparatus of the invention.

Referring to FIG. 1, the thermochemical apparatus includes a fluid-bed reactor 1 which is indirectly heated by a pulse combustor 2 having a combustor chamber 3, an aerodynamic valve 4, and single or multiple elongated conduits 5, bounding a resonant zone and having an inlet at the combustion chamber at one end thereof and an outlet at the other end.

The fluid bed reactor 1 is provided with one or more material introduction ports 6 and is charged with solid particles comprising a suitable bed material 7 which may be inert or may be of catalytic nature providing catalytic enhancement of reactions within the bed. The fluid bed reactor is also provided with a port 8 near the bottom of the reactor for introduction of a fluidization medium which may be steam, gas, evaporated liquids other than steam or a combination thereof. The flow of the fluidization medium within the fluid-bed reactor is distributed in a manner which is substantially uniform over the cross-section of the bed by distribution means 9, which is depicted in the figure as a distributor plate but could be a number of nozzles or tubes having metering holes for the uniform distribution of the fluidization medium.

At the exit of each resonance tube, an exit plenum 10 is provided to collect gases exiting the resonance tubes. Reactor products exit the fluid bed reactor through a separate port 11. The reactor products then enter a particulate matter separation means 12, depicted in FIG. 1 as a cyclone but could be a baghouse or other suitable means for separation of solids from the reactor products.

The operation of the apparatus depicted in FIG. 1, involves introducing a fuel and oxygen-containing gas into combustion chamber 3 and combusting a first part of the fuel introduced into the combustion chamber 3 under conditions effecting pulse combustion thus producing a hot gaseous stream comprising a remaining part of the fuel introduced into the combustion chamber 3, the pulse combustion being operable to produce velocity oscillations of at least about 20 Hz and acoustic dynamic pressure levels of at least about 165 dB in the combustion chamber. The hot gaseous stream from the combustion chamber is then discharged into an inlet of an elongated resonance zone bounded by a conduit wall having an inlet at one end therefor and an outlet at the other. The remaining part of the fuel in the hot gaseous stream is combusted in the resonance zone thereby further producing heat and a combustion product stream. Heat is transferred form the combustion product stream through the conduit material surrounding the resonance zone into a bed of solid particles 7 confined in a reaction zone. A fluidizing liquid vapor or gas is injected into and through the reaction zone through a port 8 at a rate operable for maintaining the solid particles in an agitated state. The solid particles in the reaction zone are thus heated by heat transfer from the combustion product stream in the resonance zone, such that the overall rate of heat transfer from the combustion product stream to the solid particles is at least about twice as high as that which would be achieved in the absence of pulse combustion.

A reactant material is introduced into the reaction zone through one or more ports 6, mixed with the heated solid particles of the bed and the fluidizing medium, and, thus undergoes endothermic reaction or physical change in the bed and is converted to useful products. The intense acoustic field radiated into the bed of solid particles 7 in the reaction zone from the resonance tubes 5 enhances mixing of the bed and reactant material charged thereto and increases rates of mass transport and reactions in the bed, thereby resulting in high process throughput rates.

Figure 5:
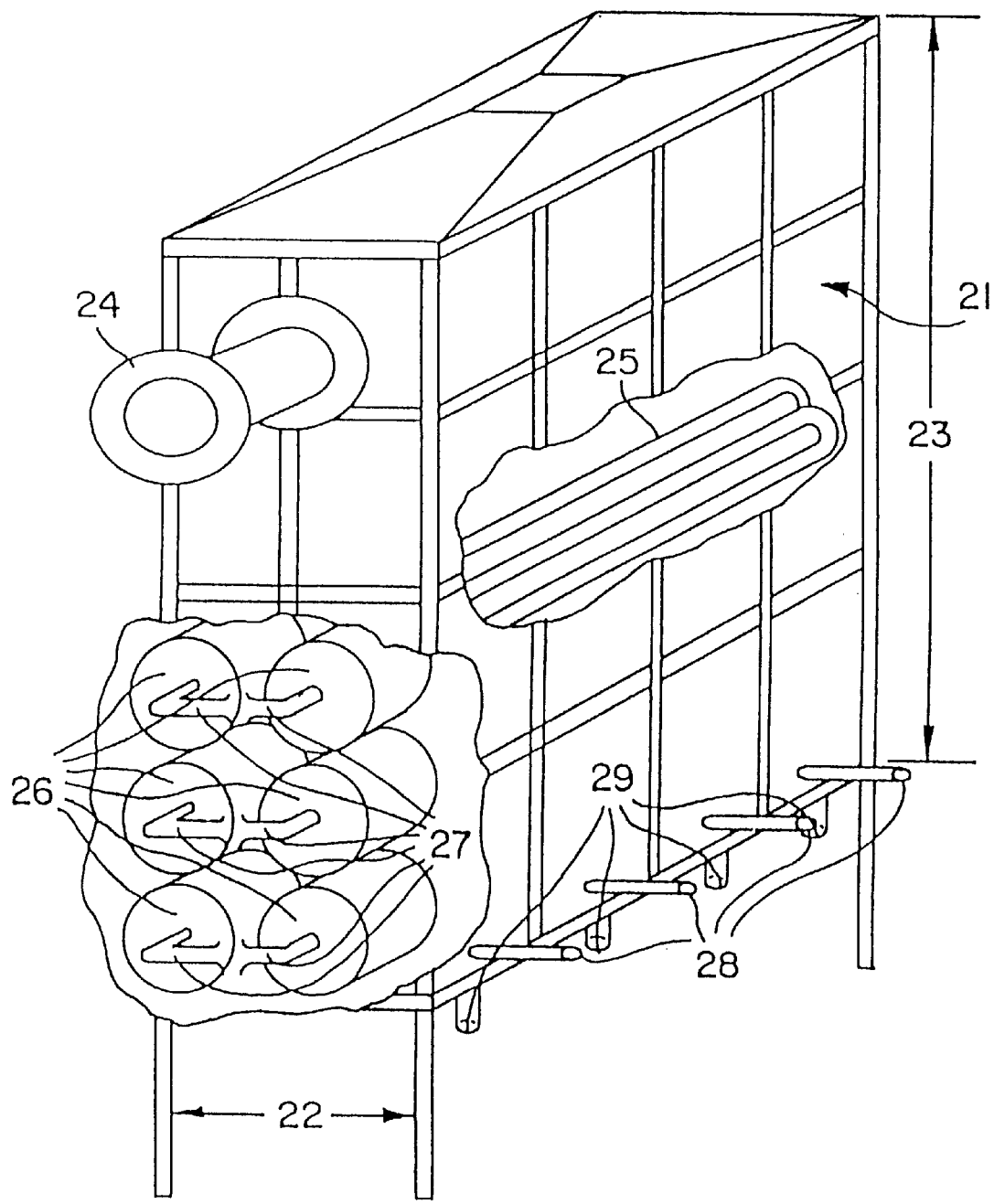
FIG. 5 depicts the preferred black liquor recovery apparatus of the invention.

The reactor of this invention is preferably constructed from a refractory-lined carbon steel but could also be made of a high-temperature alloy capable of withstanding temperatures up to about 1800° F., at pressures of up to about 12 atmospheres. In the case of high pressure operation, the reactor preferred configuration is cylindrical. With reference to FIG. 5, the reactor diameter or width 22 can vary from less than about a foot to greater than about 10 feet. The reactor height 23 can vary from less than about 5 feet to greater than about 50 feet. The height-to-diameter or width ratio of the reactor is preferably maintained in the range of about 1 to about 10. The reactor operates at pressures ranging from near atmospheric to about 12 atmospheres and the operating temperature is in the range of about 950° to about 1800° F., depending upon the type of feed material and the desired products.

In this invention, a wide range of reactors and bed materials can be used. A solid bed material may act as both a heat receiver and catalyst for the desired reaction. The use of a particular type of reactor bed depends upon the reactant material, the process being carried out, and the products desired. Bed material can be an inorganic material, including, e.g., sand, ash or metal salt, or a carbonaceous material, including, e.g., coal, coal char, petroleum coke, biomass, oil shale, spent oil shale, a mixture of inorganic material and carbonaceous material or a mixture of bed material and feed material for conversion, such as biomass, or a feed material slurry such as coal-water slurry or black liquor. The size of the bed material is preferably in the range of about 50 to about 500 microns.

The fluidizing gas, e.g., steam is injected into and passes through the bed material at a superficial velocity of about one foot per second to about 10 feet per second. The bed material thus undergoes fluidization, i.e., the particles of the bed material undergo mixing and remain in a continuous state of agitation. Fluidized bed density varies with the velocity and viscosity of the fluidizing gas or medium and size distribution, density and shape of the bed particles. Fluidizing gas may be fed to the reactor by a blower, a compressor or pump, through a gas distribution plate, nozzles or sparge tubes, preferably at a pressure slightly higher than the average reactor pressure in order to compensate for pressure drop caused by the distribution means, bed material, and downstream lines.

By the term agitated state as used herein is meant the state solid particles are in when they are in a moving, fluidized, or entrained bed and aerated by a flowing gas, or in a slurry bed. By the term agitated movement as used herein is meant the movement of the solid particles when they are in an agitated state.

After the bed of solid particles attains a uniform state of fluidization in the reactor, air and fuel are fed to the pulse combustor. The fuel can be a liquid, gas, solid, or a mixture thereof. Preferably a liquid fuel such as heavy fuel oil, or a gaseous fuel such as natural gas, or a synthetic gas is used; however, a solid fuel, e.g., coal, coal char, biomass or biomass char can also be used. As the fuel enters the pulse combustor, combustion is initiated by a spark or a gas-fired ignitor.

The reaction products and a portion of the fluidizing gas leave the reactor through a conduit at the top of the reactor. Entrained solid particles of the bed and solid reaction products, if any, may be separated in a cyclone and sent back into the reactor. A portion of the gaseous stream of reaction products and fluidizing gas, now free from entrained particulate matter, is preferably recycled to the reactor for fluidization purposes. If the product gas contains a condensable component, then preferably at least a portion is cooled to condense any readily condensable components, which are then transferred to a product recovery zone.

Figure 4:
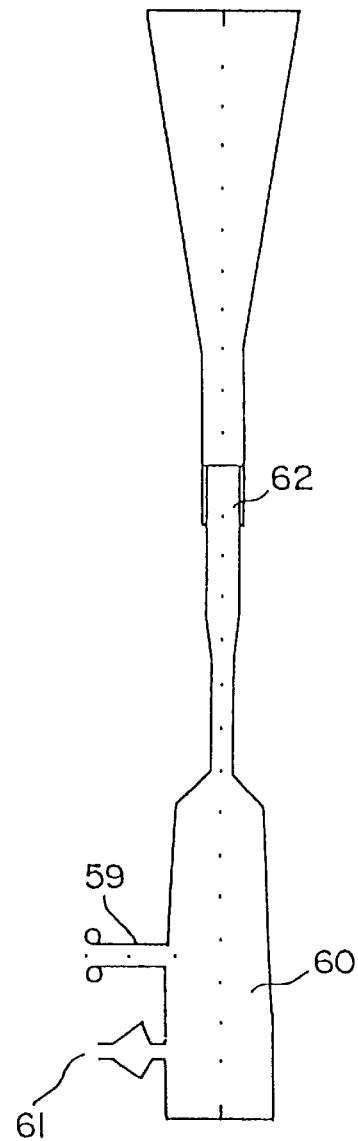
FIG. 4 shows the elements of the pulse combustor used for indirectly heating the fluid bed reactor of the invention.

As shown in FIG. 4, the pulse combustor essentially consists three components: 1) inlet valves 59 for air, preferably aerodynamic valves rather than mechanical or flapper valves, 2) a combustion chamber 60 having a fuel injector 61, and 3) one or more tailpipe or resonant tubes 62. Fuel and air enter the combustion chamber and an ignition source fires the mixture. The steady increase in volume, caused by the rapid increase in temperature and evolution of combustion products, pressurizes the chamber. As the hot gas expands, the aerodynamic valve acting as a fluidic diode permits preferential flow in the direction of the resonance tube.

Several different types of pulse combustors may be used in the apparatus and method of the present invention, including the Helmholtz, Schmidt, and Rijke tubes. Helmholtz type combustors are preferred for their superior combustion performance and the highly resonant nature of the Helmholtz configuration, which tends to yield the highest pressure fluctuations per Btu/hr of firing in given combustor volume. The resulting high level of flow oscillations improve combustion efficiency and provide, a level of pressure boost useful in overcoming pressure drop in heat exchange and any downstream ash removal subsystems.

At least two types of air inlet valves can be used. Although mechanical valves yield somewhat higher boost pressures, the reliability of these valves is generally low, particularly in solid-fueled applications. Combustion of solid fuels is more likely to result in ash deposits which deteriorate valve seatings in mechanical systems. Erosion, corrosion and metal fatigue further limit the application of mechanical valves. Aerodynamic valves, having no moving parts, are therefore preferred for their high reliability and low maintenance, The intrinsic stoichiometry of the pulse combustor can be fixed by design by those of skill in the art given the teachings herein and will remain relatively constant over a wide range of firing rates. At the lower end of this firing range, the combustion-induced pressure fluctuation in the chamber is lower. Therefore, the amount of air intake induced by the fluidic diode (the aerodynamic valve) in response to dynamic pressure fluctuations in the combustion chamber is lower. When the fuel feed rate is increased, the amplitude of the pressure fluctuations in the combustion chamber is increased due to the increase in the heat release responsible for excitation of the combustion-induced dynamic pressure. This, in turn, induces more air intake through the aerodynamic valve. The combustor operating stoichiometry is, therefore, automatically maintained over a range of firing without the need to actively control and coordinate the combustion air and fuel mass flow rates.

The primary function of the aerodynamic valve is to act as a fluidic diode which employs the pressure fluctuations in the combustion chamber for inducing intake of the combustion air. Two parameters dominate the design of an aerodynamic valve, i.e., the minimum resistance to air intake and the fluidic diodicity of the valve. The latter is a non-dimensional ratio between the resistance to flow out of the chamber and the resistance to flow into the chamber (intake). In general, the higher the fluid diodicity of the aerodynamic valve, the more air per Btu/hr of fuel firing is induced by the intake. A combustor that normally operates with high excess air would, by virtue of employing a valve with high minimum resistance to air intake (smaller minimum throat diameter), operate at lower air stoichiometry by throttling the air intake at the inlet. With a fixed damper setting at the inlet, the combustor firing rate can be varied with the induced stoichiometry remaining essentially constant for a range of firing.

It is also possible to reduce the lowest firing rate of a combustor by reduction of both the aerodynamic valve and the resonance tube minimum diameter. This also enhances the start-up characteristics of the combustor. With this design option, the turndown ratio could be greater than 8:1. This, however, may require an inlet air fan if the pressure drop downstream in the system requires it. Nevertheless, the air intake (mass flow rate) remains dependent on the firing rate since the self-aspiration and boost pressure contribution of the pulse combustor unit remains in effect. This system configuration tends to increase the maximum combustion intensity achievable for two reasons. First, with the higher flow resistance at both ends of the chamber, more dynamic pressure amplitude is obtained. Second, on air intake, the presence of an air fan tends to allow "supercharging" of the combustor to higher firing rates than are attainable under atmospheric aspirating conditions.

Pressure fluctuations generally range from 2 to 5 psi (peak-to-peak). These fluctuations are substantially sinusoidal and at frequencies characteristic of the Helmholtz/Quarter Wave fundamental mode of the combustor. These pressure fluctuation levels are in the order of about 165 to about 190 dB in sound pressure level. Sound intensity, as measured adjacent to the resonant tube wall, is in the range of 140 to 150 dB. The acoustic field frequency range depends primarily on the combustor design and is only limited by the fuel flammability characteristics. Generally, the geometry of the resonance tube (diameter, length, single or multiple tube, etc.) and resonance tube to combustion chamber volume ratios influence the frequency of the acoustic field produced. The frequency of oscillation is given by:

$$f = \frac{C}{6.28 L_t} \left(\frac{V_t}{V_c}\right)^{0.5}$$

Where:
C=speed of sound
$V_c$=volume of combustion chamber
$L_t$=length of tailpipe
$V_t$=volume of tailpipe
In general, for higher frequencies, shorter pulse combustors are needed.

The geometry of the combustion chamber can be selected to effect the fraction of the fuel burn which contributes to inducing the pressure oscillations, and the fraction which is burned downstream from the dynamic pressure peak region under the influence of the induced oscillatory flow conditions. The burn rate in the combustion chamber is dominated by vortices which are shed from the transition in the cross-sectional area of the chamber. In the resonance tube, however, the burn rate is dominated by the axial, oscillating flow velocity component which tends to increase monotonically from the resonance tube inlet to the exit.

The combustion process in the resonance tube is mostly responsible for completing the burn of char produced from larger particles which are volatilized and partially burned upstream in the chamber. The increase in the oscillating velocity along the resonance tube maintains a high rate of char burn as the char particles become more prone to entrainment and as the $O_2$ partial pressure decreases. In steady flow combustion systems, the relative motion between the gases and the solids is dependent on swirl, turbulence, etc., and these flow fields tend to get dampened downstream of the flame, the region in which they are needed most.

Figure 2:
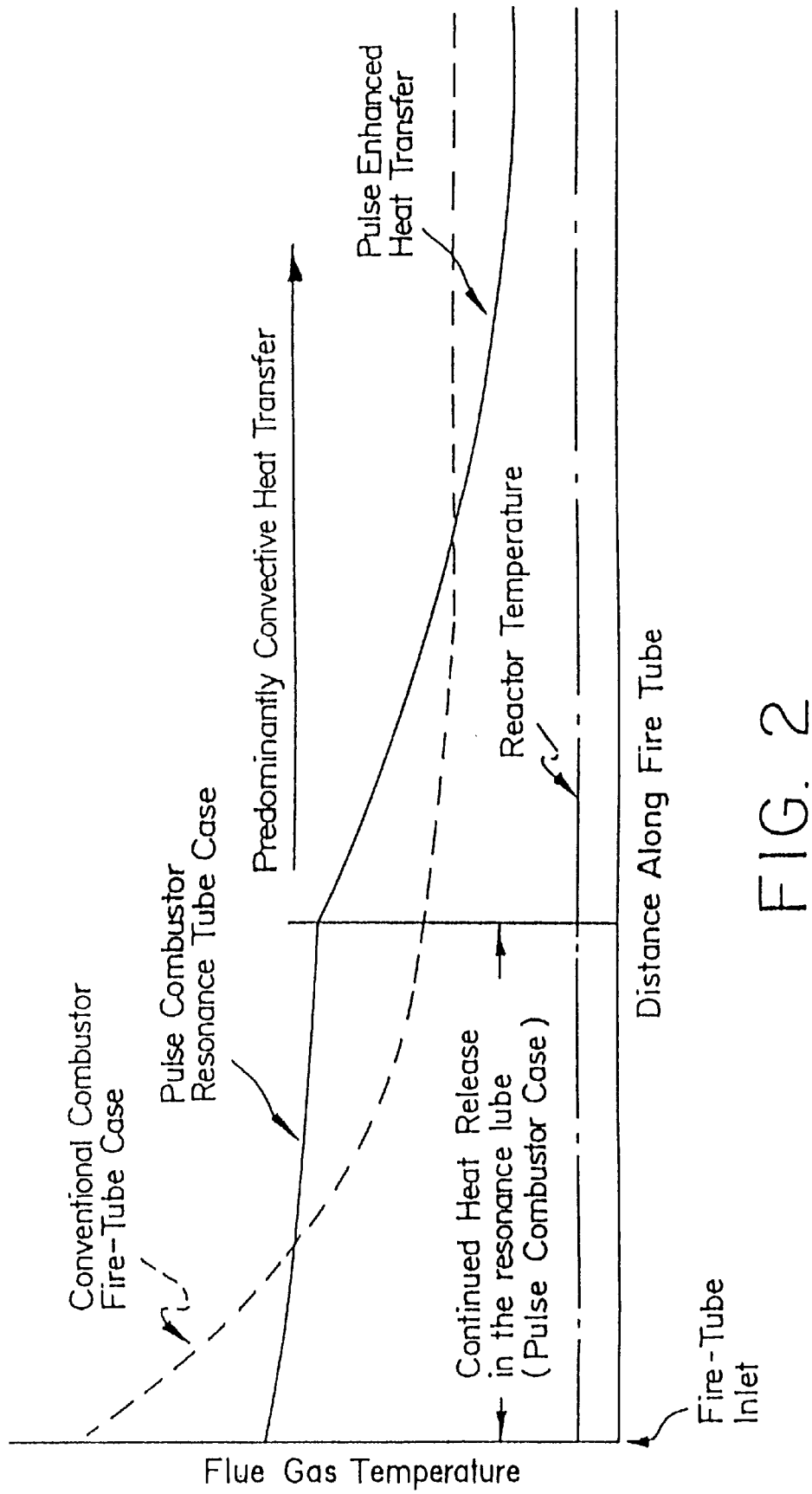
FIG. 2 shows a temperature profile along the length of the heat exchange resonance tubes of the invention as compared to the temperature profile of conventional fire tubes without pulse combustion.

In the case of the conventional combustor and conventional fire tubes, essentially all the fuel is combusted in the conventional combustor and the heat of combustion is delivered to the flue gas. Thus, the heat of combustion is carried by the hot flue gas in the form of sensible heat. Heat is then transferred from the hot flue gas through the fire-tube walls to the reactor material along the length of the fire-tube, causing the flue gas temperature to monotonically decrease as shown in FIG. 2 for the conventional combustor and fire-tube case. The heat transfer is predominantly radiative near the inlet of the fire-tube where the flue gas temperature is sufficiently higher than the fire-tube wall and reactor temperatures. Further down stream in the fire tube, as the flue gas temperature becomes lower, the heat transfer becomes more and more predominantly convective as depicted in FIG. 2. The rate of change in the flue gas temperature for the case of the conventional fire tube is proportional to the local heat transfer flux at a given distance along the fire tube length. As shown in FIG. 2, this rate of change is monotonically decreasing as the temperature difference between the flue gas and the reactor temperature decreases. Furthermore, near the exit of the fire tube, as the flue gas temperature is low and the gas velocity is slower, the convective heat transfer coefficient between the flue gas and the fire tube inner wall becomes lower, hence, the heat flux, which is a function of both the temperature difference between the flue gas and the bed temperature and the heat transfer coefficient, becomes even lower.

In the case of the pulse combustor, where the fire tubes are the resonance tubes of the pulse combustor, only a fraction of the fuel is combusted in the combustion chamber, particularly if low-grade solid fuels are employed, thus the temperature of the products of combustion at the inlet to the resonance tube is generally lower, as shown in FIG. 2. This allows the use of less expensive materials for the resonance tube as compared to the material required to tolerate higher flue gas inlet temperatures in the case of conventional fire tubes.

The rate of temperature drop of the flue gas along the resonance tube is also lower than for the case of a conventional fire tube, as shown in FIG. 2. This is due to the continued combustion and hence the heat release in the tube section near the inlet. This does not compromise the ultimate fuel conversion efficiency in the pulse combustor due to the vigorous mixing promoted by combustion-induced flow oscillations found in the resonance tubes of pulsating combustors which completes the combustion within the tubes. The slow decrease of the flue gas temperature in this region, depicted as continued heat release in FIG. 2, provides for high heat flux and heat transfer in the region with net gain over conventional fire-tube systems, due to the generally higher log mean temperature difference between the flue gas temperature and the reactor temperature in this region and the predominantly higher radiative heat transfer component present therein.

Beyond the continued combustion region, the flue gas temperature in the resonant tube monotonically decreases. Nevertheless, in the case of the resonance tube of a pulse combustor, the predominantly convective heat transfer in the balance of the tube length is higher than that found in a conventional fire tube.

The flue gas flow in the resonance tube has two velocity components. One being the mean flow velocity and the other being an oscillatory component which monotonically increases in amplitude from the resonance tube inlet to the exit. The mean velocity of the flue gas in the resonance tube of the pulse combustors employed in this invention are generally higher than those found in a conventional fire tube. This is primarily due to the combustion induced pressure boost which develops in the combustion chamber of these pulse combustors. This pressure boost, a mean pressure gain, is developed as a result of the oscillating pressure in the combustion chamber of a pulse combustor and the fluidic diodicity of the aerodynamic valve. The boost pressure in the chamber can develop flue gas velocities in the order of at least 1000 ft/sec without the need for forced combustion air or induced draft fans. The higher mean flow velocity in the resonance tube, in turn, gives rise to higher film velocities and hence higher heat transfer coefficients between the flue gas and the inner wall of the resonant tubes.

In addition, the oscillating flow velocity component, which monotonically increases in amplitude from the resonance tube inlet to the exit, further improves the convective heat transfer between the flue gas and the inner wall of the resonance tube. As the temperature of the flue gas monotonically drops beyond the continued combustion and heat release region in the resonance tube, the heat transfer coefficient increases due to the monotonically increasing amplitude of the oscillatory flow velocity component. This enhances the heat flux in this region with flue gas exit temperatures being lower than those obtained with conventional fire tubes of the same size. The lower flue gas temperature of the flue exiting the resonance tubes improves the system's thermal efficiency since more heat is extracted from the flue gas and transferred to the reactor bed to support the endothermic reactions occurring in the bed.

The design of the resonance tube could involve complex generators in principle, but this is not necessary, i.e., a straight-line generator forming a tubular or a conical section is quite practical. This degree of freedom allows control of the gas exit velocity and the overall volume of the resonance tube for a given length. The volume of the resonance tube affects both the resistance time available for completing the burn of char produced from larger particles as well as the resonant frequency of the unit. In this invention radiant heat transfer continues over a longer length of the fire tube when using solid fuels because the burning fuel particles continue to provide high luminosity foci as they flow and burn in the resonance tube.

Figure 3:
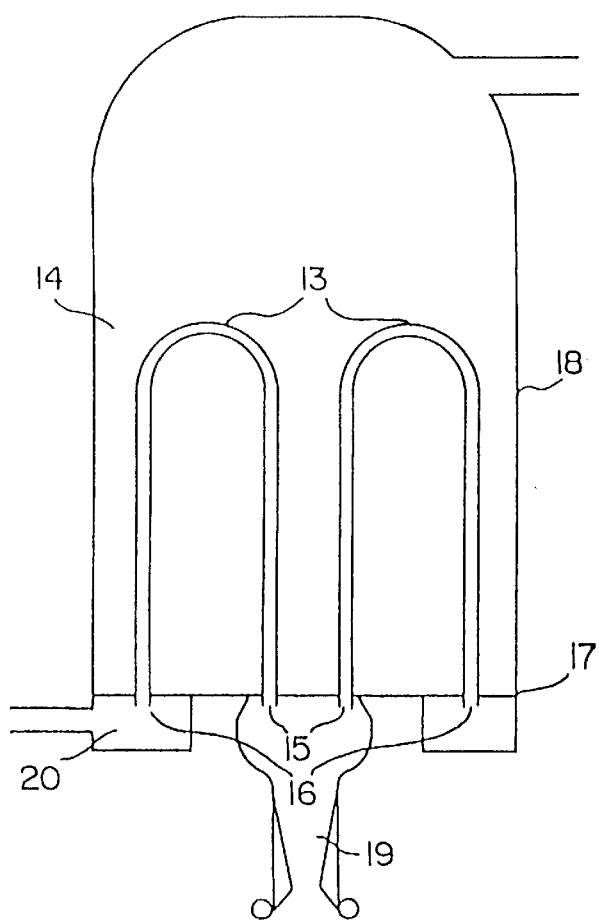
FIG. 3 depicts the preferred U-tube resonance tube configuration of the pulse combustor integrated fluid bed thermochemical reactor of the invention.

There are various configurations suitable for the heat transfer tubes according to the present invention, including a single straight tube, multi-tubes, U-tube(s), coiled tubes, and shrouded or shielded tubes. The size, shape and number of the resonance tubes depends upon the heat transfer profile required and the reactor size. In one embodiment, the products of combustion are discharged through two separate resonance tubes immersed within the reactor. After heat exchange from the tubes to the bed material, the flue gas streams combine in a plenum or manifold just outside the reactor. In one preferred embodiment, the in-bed heat transfer surface comprises parallel resonance tubes 5 having inlets in communication with combustion chamber 3 and outlets in communication with common plenum 10. In another particularly preferred embodiment, depicted in FIG. 3, the resonance zone comprises a single or multiple tube 13 having a U-shaped bend near the top of the fluid bed 14 and wherein the inlet 15 and outlet 16 of the resonance tubes are near the bottom 17 of the reactor 18. In this embodiment the combustion chamber 19 is in communication with the inlet of the resonance tubes 15 and an exhaust plenum 20 is provided in communication with the exit 16 of the resonance tubes. Such U-shaped resonant tubes are advantageous in alleviating problems caused by thermal expansion and stress, which can result in separation of tube couplings. In still another embodiment, the combustion gases pass upward through a bundle of resonance tubes having three sections. The combustion gases first pass through a straight tubular bundle section, then a coiled tubular bundle section and finally through a second straight tubular section before being discharged. The coiled tubular bundle of this arrangement provides a very large heat transfer surface and is thus preferable in high temperature applications.

A portion of the resonant tube may be surrounded by cylindrical shield. The shielded section may vary in length, depending upon the nature of the bed and the feed material to be processed which may require that the temperature of the metal in contact with the bed be maintained below a given temperature, e.g., to avoid formation of smelt. A relatively stagnant film of gas remains confined in the annular space between the resonant tube and shield, thereby maintaining the outer surface of the shield below the desired temperature. In the case of black liquor recovery this temperature is below about 1350° F. The annular space may cause the average outside surface temperature of the shield to be from about 300 to 400° F. lower than the average outside surface temperature of the shielded region of the resonance tube. The shield is useful in preventing undesirable physical or chemical changes in bed or feed materials resulting from the relatively high outside tube surface temperatures near the inlet of the tubes.

A most preferred embodiment of this invention is the application of the invention to all types of black liquor recovery, particularly in Kraft black liquor recovery and sulfite black liquor recovery. The description provided herein employs the case of Kraft black liquor recovery as an example since that process spans more comprehensively the relevant process variables.

Black Liquor Recovery

The preferred embodiment of the black liquor reactor 21 is provided in FIG. 5. Near the top of the reactor, a product gas and entrained product chemicals exit 24 is provided from the reactor's freeboard zone of the fluid bed. Immersed in the fluid bed are the tubes 25 of a number of modular pulse combustor units 26 rated each at about 1.5 to about 5 MMBtu/hr of firing rate, depending on the size of the reactor and its throughput. The preferred capacities for such reactors are 1, 2, 3, 6 and 10 tons/hr of black liquor solids processing. The preferred size of a reactor for processing six tons per hour of black liquor at near atmospheric pressure in the reactor is about 8 feet wide, 5 feet deep, and 18 feet high. The preferred multiple resonance tube pulse combustor operation is tandem with aerodynamic valve coupling of each tandem unit 27 for out-of-phase operation, thus reducing the noise to the outside and enhancing pressure oscillations in the pulsating combustors.

The reactor is also provided with means 28 for spraying the liquor directly onto the fluidized bed material. The preferred fluid bed material for this embodiment is sodium carbonate (soda ash), having a particle size distribution of about 150 microns to about 600 microns, with a preferred mean size of about 250 microns.

The reactor also is provided with steam and recirculated product gas injection means 29 to distribute the steam and recirculated gas to fluidize the bed. The preferred-steam temperature entering the bed is about 1100 to 1200° F. and the preferred fluidization velocity is about 2 to 4 ft/sec.

Figure 6:
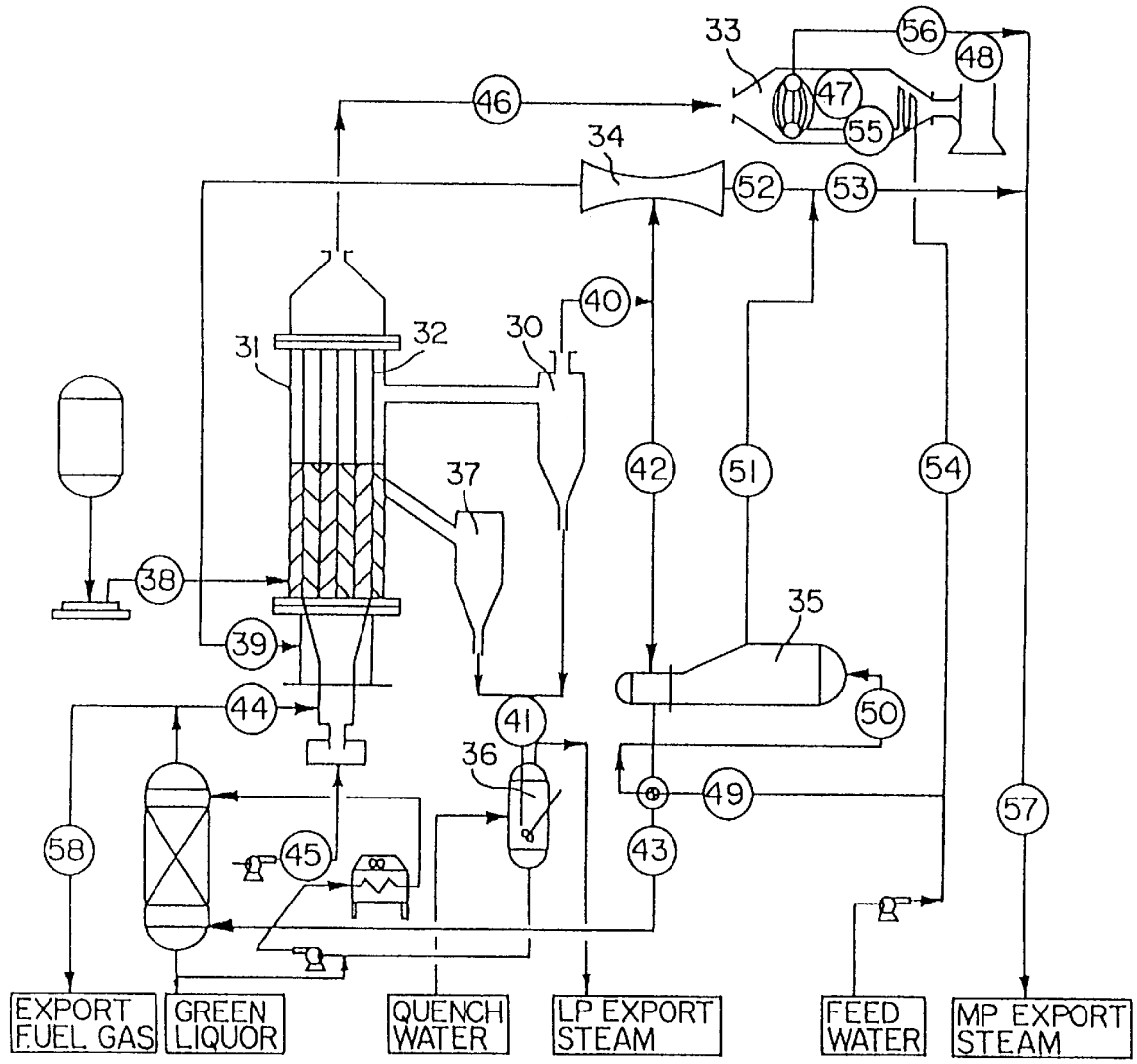
FIG. 6 depicts a flow diagram for the black liquor recovery process of the invention.

Referring now to FIG. 6, depicting a flow diagram for the black liquor recovery process, the gasifier is represented by reactor 31. Here, black liquor is injected into a fluidized bed which is fluidized with steam and a recirculated portion of the product gas. Although a reasonably atomized spray quality is desirable, the spray pattern does not significantly affect gasification performance. The black liquor feed is preferably injected into the bed through a steam-atomized spray nozzle.

An analysis of black liquor representative of by-products from a commercial mill is provided in Table 2. Since feed typically consists of 67% black liquor solids, the feed is heated in a steam-jacketed, agitated vessel. The feed pump may consist of a progressive cavity pump or, more advantageously, a positive displacement gear pump. The black liquor is preferably maintained at approximately 180° F. in the storage vessel. The feed line to the injector should be insulated and preferably includes steam tracing. Feed injection may be facilitated through the use of sufficient feed line steam tracing, ample purging of the injector tip prior to switch over to black liquor, and use of a simple gear pump.

TABLE 2

ANALYSIS OF BLACK LIQUOR FEEDSTOCK
(67% Solids)

| COMPOSITION | WT.% (DRY BASIS) |
|---|---|
| Carbon | 37.7 |
| Hydrogen | 3.7 |
| Oxygen | 31.6 |
| Nitrogen | 1.0 |
| Total Sulfur | 4.3 |
| Sodium | 18.7 |
| Potassium | 1.1 |
| Chloride | 0.5 |
| Sulfate | 1.1 |
| Sulfide | 1. |

For black liquor applications, the bed solids consist of sodium carbonate, the residual salt formed upon black liquor gasification. Bed charge may consist of a variety of commercial sodium carbonates. Products differing in mean particle size may be combined to provide the desired fluidization properties.

In order to prevent bed agglomeration, black liquor should be fed into the bed starting at a temperature of about 1200° F. and, preferably, about 1000° F. At this temperature, the carbon deposition rate is higher than the gasification rate. Soda ash bed material should have a residual layer of carbon in order to prevent bed agglomeration. Where the starting soda ash contains an excessively low carbon level, the entire carbon layer may be gasified by the fluidizing steam before the bed reaches the desired starting temperature. When the carbon layer disappears due to gasification, soda ash may fuse together as a result of impurities, e.g., NaCl and KCl. A carbon layer on the soda ash granules can be maintained to prevent such ash fusion. Char gasification on the sodium carbonate solids is preferably controlled by feed rate and temperature such that the bed establishes an equilibrium carbon level of between about 0.5 to 10 percent.

The reactor temperature is preferably maintained in the range of 1150° F. to 1300° F. to ensure that smelt formation does not occur. The product chemicals can then be easily and safely discharged from the bed in a solid state. Lower operational temperature reduces steam heat losses, improves thermal efficiency and reduces the cost of reactor materials of construction. Nevertheless, operating the bed at temperatures above 1150° F. allows economic throughputs with minimum carbon rejection. It is essential that the fire-tube wall temperature be maintained below the temperature at which the bed material softens (1350° F.) in order to prevent bed agglomeration. Preferably, the bed temperature is monitored at several locations, as is the fire-tube wall.

The bed is preferably operated at near atmospheric pressure with superficial fluidization velocity of approximately 3 ft/sec. Initial fluidization may be accomplished by injecting nitrogen gas, the steam being introduced after the bed attains a uniform start-up temperature. The lower limit superficial velocity is approximately 0.1 ft/sec. Fluidization and bed temperature become stratified over the length of the reactor at or below such velocity. Under normal operating conditions, the temperature of the bed is uniform throughout.

Heat is supplied to the fluid bed 31 by resonance tubes 32 connected directly to the pulse combustor chamber. The flue gases from the combustor, which exit the reactor at about 1300° F. to 1400° F., are sent to a water or fire tube boiler 33 for heat recovery. The product gas may also be combusted in such boilers to provide a single means for steam generation. By transferring heat indirectly, product gas with heating values of approximately 300 to 400 Btu/scf can be generated from 67% black liquor. The preferred in-bed heaters for this embodiment are the resonance tubes of a pulsating combustor, as described earlier; however, this is not essential since properly shielded and controlled electric heaters, for example, are technically feasible for heating the bed and could be economically feasible in parts of the world where the cost of electricity is unusually low, for example, where hydropower generators are found. Another example of a bed heater is the use of superheated steam flowing through heat exchanged tubes immersed in the fluid bed. In the case of both the electric heater and the steam tube heater examples described above, there is no radiation of an intense acoustic field from the heater tubes to the reaction zone, which is beneficial to the rate of reaction and bed fluidization.

The preferred gasification reactor configuration takes the form of a rectangular fluidized bed with sidewall-mounted pulse combustors located at several elevations and connected to horizontally mounted resonance tubes. This configuration simplifies manifolding of fluidizing steam, and allows easy maintenance of the combustors. A typical combustor consists of two coupled pulse combustors operating out of phase for noise reduction. The dual module would have a nominal firing capacity of about 2.5 MMBtu/hr. Three such modules would be required for a one ton per hour (black liquor solids) unit, such as depicted in FIG. 5.

A radiation shield is preferably affixed adjacent the position of the tubes closest to the combustion chamber to reduce tube-wall temperature in contact with bed solids, and prevent their softening from contact with a high temperature bare-metal tube. The product gas exits the gasifier and enters cyclone 30 where entrained fine particulates are separated from the gas stream. A portion of the product gas is recycled to the fluidized bed through ejector 34. The motive fluid for the ejector is steam, which may be internally generated within a waste heat boiler 35. The balance of the product gas is cooled in a kettle type steam generator 35 and is exported for power generation or process use. The product gas heating value varies from about 240–400 Btu/scf and contains as much as 65 volume percent hydrogen, thus having an energy density several times that achievable with autothermal systems.

The cyclone fines elutriated from the bed only account for a small fraction of the feed carbon. This carbon is easily recovered upon dissolution of the recovered sodium carbonate solids. This carbon may be reinjected into the bed and consumed in the pulse combustor to provide endothermic heat for the reactor, or it may be utilized elsewhere in the mill. If reinjected, it is beneficial to premix with fresh black liquor to promote sticking of the residue to bed solids and reduce premature elutriation from the bed.

Solids discharge systems for fluid-bed applications are available with proven and safe performance records. Typically, the reactor is furnished with a screw-type solids withdraw valve 37 and solids are collected at regular intervals to measure carbon content as a function of throughput in order to monitor specific gasification rates. Despite the fact that both sulfur and sulfate are being introduced to the bed in the form of black liquor, the bed sulfur and sulfate levels diminish or remain constant. Sulfide content is negligible in the bed.

The inorganic salts contained in the bed solids draw-off 37 and cyclone materials are comprised primarily of sodium carbonate and also include sodium sulfide, sodium sulfate, sodium chloride, and residual carbon in smaller quantities. These materials are dissolved in a dissolution tank 36 to recover the inorganic salts for recycling to the paper plant. In addition, the carbon value is recovered, e.g., in an agitating dissolving tank 36 followed by a disk filter (not shown) for carbon recovery. Water may easily penetrate the porous carbon shell in order to effectively dissolve contained salts. Thus, dissolving efficiency is about 97.7–99.9 percent.

The bulk of the black liquor feed sulfur content is advantageously emitted in the form of hydrogen sulfide. These species can be easily recovered to form green liquor through a simple scrubbing operation. The cooled process gas generally enters a scrubbing column where the recirculating scrubbing liquid consists of alkaline sodium carbonate formed in the dissolving tank 36. The process gas is scrubbed to form green liquor. The cleaned, desulfurized product gas generated from the scrubber may be utilized as a fuel source for a boiler, gas turbine or other unit. The green liquor may then be sent to the conventional mill causticizing loop, where lime is added to precipitate carbonate and, thus, form sodium hydroxide and sodium sulfide.

The primary sulfur reactions believed to occur in the gasifier include the following:

1. Lignin→Organic Sulfides+$H_2S$
2. Organic Sulfides+$H_2O$→CO, $CO_2$, $H_2$+$H_2S$
3. $Na_2S$+$H_2O$+$CO_2$→$Na_2CO_3$$H_2S$
4. $Na_2SO_4$+4CO→$Na_2S$+4$CO_2$
5. $H_2O$+CO→$CO_2$+$H_2$ Reactions (1) and (2) represent thermal and steam gasification steps leading to the production of low molecular weight gas species and hydrogen sulfide. Due to the catalytic nature of the inorganic salts, the steam gasification reactions diminish organic sulfide species to very low levels. Reaction (3) depicts the carbonation of sodium sulfide in the presence of steam and carbon dioxide. This reaction becomes important when the partial pressure of steam is high and temperatures are relatively low, such as found in the gasifier. Reaction (4) represents the reduction of sodium sulfate to sodium sulfide via the reaction with carbon monoxide. Reaction (5) represents the water-gas shift equilibrium which primarily effects the relative ratio of carbon monoxide to carbon dioxide. Neither sodium sulfate nor sodium sulfide is stable in the gasifier environment. The net reaction for sulfate is, therefore:

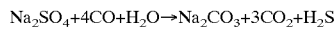

$$Na_2SO_4+4CO+H_2O \rightarrow Na_2CO_3+3CO_2+H_2S$$

The hydrogen sulfide is then absorbed in an aqueous phase to regenerate sodium sulfide. The sodium carbonate solution generated by dissolution of the bed solids provides an ideal solution for scrubbing the product gas. Since the sodium carbonate solution so formed is slightly basic, the acidic hydrogen sulfide species is absorbed as sodium bisulfide. This green liquor is then returned to the conventional causticizing loop.

About 82% of the total sulfur fed to the reactor is removed in the gas phase. Over 67% of the sulfate input is transformed to a reduced form. In another manner of speaking, only 3% of the total sulfur input remains as sulfate. The system of this invention is therefore capable of generating sodium sulfide at a very high conversion efficiency.

Table 1 depicts a material balance for a one ton per hour (black liquor solids) capacity unit based on the flow diagram. Eighty percent of the total sulfur is assumed to be stripped to hydrogen sulfide in the product gas and 70 percent of the sulfur content in the black liquor feed is reduced. The hydrogen sulfide is quantitatively absorbed in the scrubber. The carbon rejected with the product solids is 5 percent and recovered for reinjection into the gasifier.

Table 3 depicts a mass and energy balance summary for the one ton per hour unit. The balance is based on the production of fuel gas combusted in an auxiliary boiler. As seen, the fuel gas export accounts for about 7.473 MMBtu/hr or about 72 percent of the net energy output. Export steam production accounts for 2.424 MMBtu/hr or 23 percent of the energy output. Recoverable carbon accounts for the balance of the energy output. Based on the total energy output relative to the black liquor feed input, the net system thermal efficiency is about 78.7 percent. If only steam export is desired, it may be accomplished by combusting the export fuel in the flue gas waste heat recovery system. If a high efficiency boiler is employed, the net thermal efficiency for the steam export only case is about 67 percent, which efficiency exceeds, or is competitive with, the efficiency achievable in large-scale Tomlinson recovery boilers, despite the small size of the black liquor gasification and recovery system of the present invention.

TABLE 3

MASS AND ENERGY BALANCE SUMMARY

| | lb/hr | MMBut/hr |
|---|---|---|
| INPUT | | |
| Black Liquid Solids (6600 HHV) | 2000 | 13.200 |
| TOTAL INPUT | | 13.200 |

TABLE 3-continued

MASS AND ENERGY BALANCE SUMMARY

|  | lb/hr | MMBut/hr |
|---|---|---|
| OUTPUT | | |
| Fuel Gas Export | 1140.8 | 7.473 |
| (286 Btu/scf dry HHV) | | |
| Export Steam | 2090.0 | 2.424 |
| (600 psig, Sat.) | | |
| Recoverable Carbon | 34.0 | 0.489 |
| TOTAL OUTPUT | | 10.386 |
| LOSSES | | |
| Flue at Stack | 6976 | 1.503 |
| Hot Salts Discharge | 863 | 0.251 |
| Process Gas to Scrubber | 2688 | 0.877 |
| Heat Loss from R-1 | — | 0.183 |
| TOTAL LOSSES | | 2.814 |
| TOTAL OUTPUT PLUS LOSSES | | 13.200 |
| NET THERMAL EFFICIENCY WITH CARBON RECOVERY | | 78.7% |

The present system can be constructed in modular units with capacities in the range of one to ten tons per hour. These units can be skid mounted, truck or rail transportable and require a minimum level of field erection. Thus, a particularly advantageous application of the black liquor gasification and recovery system of the invention arises in the incremental capacity addition to Kraft or sulfite pulping processes.

Biomass Gasification

Referring now to the apparatus depicted in FIG. 1, the biomass gasification reactor consists of an indirectly heated fluid bed 7, with sand or other solid material being fluidized by a fluidizing gas or steam injected through a distributor plate or a number of injection nozzles 9 at the bottom of the bed. The cylindrical reactor has several port holes 6 for biomass injection options. Normally, biomass is injected at the lower port to increase residence time. In addition to the biomass injection ports, a side gas exit port 11 is provided at the top of the free-board section of the bed.

The pulse combustor is fired upward with the fuel injected into a combustion chamber 3 below the reactor. The pulse combustor in this design has 12 resonance tubes emanating from the combustion chamber (the schematic shows less tubes for simplicity). The heat transfer coefficient in the biomass gasifier typically ranges from 30–40 Btu/ft$^3$/hr/°F., which represents an enhancement ratio of at least about 50% compared to steady flow conditions found in conventional fire-tube systems. However, the heat release rates in the pulse combustor are much higher than for conventional systems. Therefore, the heat transfer rates in practice are several times higher than for conventional systems.

Product gas from the fluid bed and flue gas from the combustor are passed through cyclones to capture char and elutriated bed material. The flue gas from the pulse combustor can then be used for superheating steam.

Compressed air is supplied by a compressor to start-up the pulse combustor. Air is injected into the combustion chamber before the fuel is admitted and with the combustion chamber spark plug turned on. Fuel is then admitted and the pulse combustor started. The preferred fuel for combustion is biomass and biomass char supplemented to a small extent by the product gas. Combustion of the solid particles of char and biomass are completed in the resonance tubes. Conventional combustors, designed to provide sufficient residence time to burn the char and biomass to near completion, significantly increase overall capital costs because of their size, pressure drop requirements (particularly in the case of fluid beds), and the extensive insulation needed to reduce heat losses from the large combustors. Utilizing strictly product gas to supply the endothermic heat of reaction reduces the capital cost for the combustor, but also reduces throughput of net product gas from the gasification plant. With the use of pulse combustion, biomass and char can be burned directly in the combustor with only a small fraction of product gas. Char and biomass are thus burned efficiently in the same compact combustor at high heat release rates (4–6 MMBtu/hr.cu.ft.). This also enhances radiant heat transfer in the resonance tubes due to the luminous burn of the char of these solid fuels.

At the bottom of the reactor, where biomass is injected directly into the bed, the heat transfer between the bed-material and the material being processed is very high—a characteristic of fluid beds. This results in very high rates of devolatilization and pyrolysis. This in turn results in the formation of char which is extremely porous. Combustion of biomass char that has a high degree of porosity is easier than combustion of non-porous char particles. High rates of devolatilization also tend to yield higher quality gas, which leaves the char and travels rapidly through the fluid bed to the reactor exit. Steam, which is used to fluidize the bed, can also react with the heavier species and carbon in the char to produce lighter products. All these processes are endothermic and produce higher quality products if they proceed at a higher rate. The availability of high rates of heat transfer and the intense acoustic field radiated into the reaction zone support such high reaction rates.

Compressed air may also be employed to fluidize the bed, including autothermal operation during heat-up with the pulse combustor running at full capacity. This helps bring the bed up to temperature quickly. Biomass may be fed into the bed when the bed temperature reaches about 600° F. In general, burning biomass in the bed is not necessary since the heat transfer from the tubes is high and the bed can be brought to operating temperature in a short period of time without autothermal fluidization.

When the bed reaches operating temperature (about 1000 to 1400° F., preferably about 1200° F.), air fluidization is halted and the system is switched to steam. Steam is provided by a boiler and is superheated by the flue gas before entry into the fluid bed. The steam-to-biomass feed ratio is preferably in the range of about 0.5 to 1.4. The steam residence time is preferably about 2 to 4 seconds with a velocity of about 3–10 ft/s.

Biomass is then introduced at the desired feed rate and the system operated for gasification. The biomass is fed under a blanket of low pressure to the desired feed port and into the fluid bed.

Pressure fluctuations in the pulse combustor preferably range from 2 to 5 psi (peak-to-peak). These pressure fluctuation levels are in the order of 165 to 190 dB in sound pressure level, resulting in 140–155 dB of radiated sound pressure outside the resonance tubes. The acoustic field radiated into the fluid bed enhances both heat and mass transfer within the fluid bed itself and reaction rates in the gasifier. Results of the biomass gasification indicate that the reactor yields higher product quality and lower tar/char production levels than are achieved by others at reactor temperatures which are 100 to 150° F. higher than those of the reactor and process of the invention. The radiated acoustic field also improves bed fluidization characteristics and bubbling in the bed (growth of gas bubbles) is essentially eliminated. This affects species breakthrough in the bed and improves reaction rates (steam utilization) and product quality. As a result of enhanced reaction rates, the process yields very high carbon conversion to product gas (97%), low char production (less than 3%) and virtually no tar (less than 12 ppm in the condensate). Because of enhanced $C_2$ production, the overall heating valve of the product gas is high (about 525 Btu/ft$^3$ at 1200° F.), despite relatively low methane concentration. In addition, approximately 0.20 percent of the dry product gas is acetylene (about 5% of the $C_2$ produced). Kinetics for acetylene formation generally are not favorable at 1200° F. In fact, the biomass gasification process of the invention results in the formation of many high temperature isomers. Acoustic stimulation in the gasifier is responsible for the increased rates of reaction causing such higher temperature isomers to form at moderate reactor temperatures.

Steam Reforming Heavy Liquid Hydrocarbons

In another preferred embodiment of this invention, the fluid-bed reactor is a first stage of a two-stage steam reformer for heavy liquid hydrocarbons, including, e.g., Numbers 2, 4 and 6 fuel oils, Bunker C residual fuels, and coal-water slurry fuels.

In this embodiment of the invention, the first stage is a fluid-bed reformer and the second stage is a high-temperature, fixed-bed steam reformer. The fluidized bed section employs a calcium aluminate-based catalyst to provide for the activation of the steam and partial reforming of the fuel. The fluid bed thus functions as a first-stage reformer. The primary function of this stage is to increase the activity of the steam and partially reform the feedstock to light hydrocarbons and hydrogen prior to its entering the high-temperature, fixed-bed reformer. The fluid bed also transforms the bulk of the sulfur in the fuel to $H_2S$ by production of sufficient hydrogen partial pressure. Introducing the partially reformed fuel to the second stage high-temperature, fixed-bed reformer controls sulfur poisoning of the fixed-bed catalyst.

In addition to acting as a first-stage reformer, the fluid bed serves two other important functions. The first is to provide a means for rapid vaporization and pyrolysis of the heavy fuel in the fluid bed. To achieve this objective, the fuel is atomized and deposited onto the hot surface of the fluid-bed material. The fluid bed thus acts as a direct contact heat exchanger. Rapid evaporation and pyrolysis of the fuel is realized by ensuring that the transfer of heat between the catalyst surface and the fuel is provided through nucleate boiling. Fuels as heavy as Bunker C and No. 6 fuel oil have been successfully evaporated according to the principals of this invention.

In addition to the evaporation of fuel, the fluid bed provides another important function by uniformly mixing the activated steam with the evaporated fuel. Superheated steam is used as the fluidizing medium and uniform mixing between the fuel vapor and the steam is readily achieved.

Partially reformed fuel is then supplied from the fluid bed (first-stage reformer) to a fixed bed (second stage). The fixed bed is operated at high temperature, above about 1650° F., and employs sulfur-tolerant catalysts that do not contain nickel (to avoid sulfur poisoning). Heat is supplied to the fixed bed by an in-bed heater means. In the preferred embodiment, the in-bed heaters are resonance tubes of one or more pulse combustors. The fixed bed is preferably comprised of a catalyst-packed tube design.

A small portion of the hydrogen-rich product gas produced by the second stage may be recirculated back to the fluid bed to provide appropriate fluidization of the bed as well as to further reduce the tendency for carbon formation and sulfur poisoning.

This embodiment of the invention provides several degrees of flexibility not available in existing reforming technology. Use of a fluid bed achieves rapid vaporization of the fuel and rapid mixing with steam. Evaporation of the liquid fuel in a direct contact heat exchanger maximizes heat flux dissipation into the liquid and thus minimizes the evaporation time, and hence, the potential for carbon formation. Partially reforming the fuel before introduction to the fixed-bed reformer avoids carbon production and avoids sulfur poisoning of the second-stage reforming catalyst.

Use of a two-stage reformer provides an important degree of flexibility in the reforming of heavy hydrocarbon fuels since it enhances the control of carbon production and minimizes the potential for sulfur poisoning of the catalyst surface. Use of a fluid bed in the first reforming stage provides several advantages pertaining to fuel evaporation, fuel/steam mixing, and partial reforming of heavy hydrocarbons to light hydrocarbons. The fluid bed also provides the flexibility to regenerate the catalyst and prevent excessive carbon buildup.

Processing of Industrial and Municipal Waste

In another embodiment of this invention, steam gasification of energy-containing sludge waste streams such as those emanating from municipal waste treatment and industrial by-product waste is achieved with the injection of the waste as a sludge directly into the hot fluidized bed through an appropriate injection port. Steam for the gasification reaction is provided by a boiler and is superheated by the flue gas from the resonance tubes.

Results of sludge waste gasification for fiber waste sludge containing plastic material indicate high reaction rates due to the high rate of heat transfer into the fluid bed and the enhanced heat and mass transfer rates induced in the fluid bed by the presence of the acoustic field. The product yield was comprised of a medium Btu gas with a heating value greater than 400 Btu/scf, richer in hydrogen by about three to four times that achievable with air-blown direct gasifiers.

Gasification of Coal and Peat

In another embodiment of this invention, steam gasification of coal and peat is achieved with injection of the material in slurry form, or otherwise dry, directly in the hot bed fluidized by steam. Catalysts may be used such as those described for the steam reforming of heavy liquid hydrocarbons in order to activate the steam and enhance steam reforming and char gasification reactions.

The preferred fuels for steam gasification within this embodiment of the invention are low-rank coals and low-rank coal slurries. The low-rank coal is directly injected into a hot fluid bed of calcium aluminate and limestone maintained at about 1400–1600° F. and up to 100 psi. The devolatilization of coal is completed rapidly due to the high heating rate and heat transfer in the fluid-bed. Rapid devolatization results in a very porous and reactive char. The steam/char reaction takes place in the presence of calcium-aluminate and CaO resulting in the formation of CO and $H_2$. Depending on the particle size distribution of the fuel and the fluidization velocity, the char continues to react with the steam until it is elutriated from the bed. The elutriated char is separated, e.g., in a cyclone. Preferably, dry sulfur sorbents such as limestone, having the appropriate particle size distribution are also injected into the bed to absorb sulfur. The attrition of the calcium-aluminate catalyst in the bed is very low and, hence, costs due to elutriation loss of catalyst are low.

The solids (char, limestone and some catalyst) separated in the cyclone are preferably fed to the pulse combustor with some product gas to provide the reaction heat to the fluid-bed reactor. The size of the coal is selected such that about 80 percent of the heat needed for the combustion is in the elutriated char particle. The rest of the heat required is obtained by the product syngas which is fed to the pulse combustor along with elutriated char, ash, and limestone. The limestone in the pulse combustor will continue to absorb sulfur released from char. The embodiment of the invention achieves 78 percent sulfur capture when firing coal with limestone in a pulse combustor with 1.5:1 calcium-to-sulfur ratio.

Mild Gasification of Coal

In another embodiment of this invention, coal is pyrolyzed in a mild gasification process to produce useful fuel gases, liquids, and solids. In this embodiment, the reaction zone is charged with coal char. Coals having high volatile content, particularly caking coal, are injected into the fluid bed and pyrolyzed at moderate temperature of about 1200° F. The fluid bed provides very high rates of heating and devolatilization, thus producing a highly porous char in the bed and product gases which include vapors of liquid hydrocarbons. The liquids can be further processed in a refinery to produce useful liquid fuels. The product gases are used to fluidize the bed by recirculation, providing carbon monoxide and hydrogen to the mild gasification process so as to improve the liquids product quality. A small amount of steam is also added to the fluidizing medium to improve performance. The highly porous char is then sold for use in coal-fired boilers; Therefore, this embodiment of the invention has the object of producing synthetic gaseous and liquid fuels from suitable coal resources at mild reactor conditions and low capital cost.

Chemicals Cracking and Production

In another embodiment of this invention, a heavy liquid hydrocarbon and steam are injected into a fluid-bed reaction zone under controlled conditions to optimize the production of high-value/chemical products, such as ethylene, propylene, and butylene. The preferred temperature range for the reaction zone is 1600 to 1800° F. The preferred pressure range is 20 to 30 psia. The preferred fluid-bed solids size is 600 microns.

In this embodiment, liquid hydrocarbon fuel is atomized directly onto the hot bed solids comprising either an inert substrate or an acid catalyst. Direct contact of the hydrocarbon fuel with the hot solids results in heating rates that exceed 1,000,000° C./sec. Those experienced in the art of hydrocarbon cracking for the production of olefinic compounds recognize that increased product yields are obtained through the achievement of high rates of heating. Product gases from the reactor are rapidly quenched to prevent secondary coking reactions. The cooled product gases are then separated, through conventional distillation means, to yield have-valued products such as ethylene, propylene, butylene, hydrogen, and fuel gases.

In the currently used hydrocarbon cracking technology, hydrocarbon and steam are introduced into an indirectly heated tubular furnace reactor. Heat transfer from the tube wall to the reactants is primarily convective. Due to the limited rates of convective heat transfer that can be achieved in a tubular furnace reactor, the rate of reactant heating is also limited. This results in less than optimal yields of high-valued olefinic components.

In the preferred embodiment, the rate of reactant heating is not controlled by convective heat transfer mechanisms. Instead, direct contact conduction between the liquid hydrocarbon and the hot solids promotes extremely high rates of heating. Furthermore, the hot solids, which are typically 600 microns in diameter, present an enormous surface area for contact heat transfer. For example, the available surface area for heat transfer in a tubular furnace reactor is only 1 square meter per cubic meter of reactor furnace volume, while the available surface area in the preferred fluid-bed reactor is 5000 square meters per cubic meter of reactor bed volume.

Under hydrocarbon cracking conditions necessary to yield high levels of olefinic compounds, tubular furnaces experience high rates of coke deposition on the internal tube wall surfaces. This further limits the rate of heat transfer and elevates tube wall temperatures. For this reason, decoking of the tube wall surface is performed at regular intervals. Decoking involves reacting the deposited carbon with steam or air. The use of steam is desirable since the temperature of the decoking operation is more easily controlled than for air decoking which is highly exothermic. However, steam decoking is a slower process requiring longer periods of downtime. In the preferred fluid-bed embodiment, coke deposition on the hot solids does not limit the rate of heat transfer or reactant heating. Any coke that forms on the in-bed heat transfer surface will be scrubbed by the action of the fluid-bed solids. Thus, the severity of coking is less pronounced for the preferred embodiment compared to tubular furnace reactors. Also, if decoking is required for the preferred fluid bed embodiment, excessive overheating is avoided due to the uniform temperature distribution characteristics of the fluid bed.

Recovery of Oil from Oil Shale, Tar Sands and Other Oil-Bearing Minerals

In another embodiment of this invention, the recovery of syncrudes from oil shale, tar sands, and other oil- or bitumen-bearing minerals can be made cost-effective by producing high yields of light condensible hydrocarbons.

The preferred fuels within this embodiment are oil shale and tar sands. In this embodiment, oil shale, suitably sized, is fed into the thermochemical reactor. The bed material is char from previously retorted oil shale. Small amounts of superheated steam and recirculated product gas are used to fluidize the bed. The superheated steam enters the bed at 1450–1500° F. The bed is maintained at an operating temperature of 1000 to 1100° F. by indirectly heating it with the pulse combustor. As the superheated steam enters the bed, the char-steam endothermic reaction ensues. This results in production of primarily CO and hydrogen. The temperature of the steam is rapidly reduced to the bed temperature due to the endothermic carbon-steam reaction and the vigorous mixing in the fluid bed. The pulse combustor is fired with char and some of the product gas. The combustion introduces oscillations that produce a turbulent unsteady-state flow in the resonance tubes. This enhances heat transfer from the walls of the resonance tubes to the fluid bed. The overall heat transfer coefficient is as high as 50 Btu/hr/ft$^2$/°F.

The intense acoustic field radiated from the resonance tubes into the fluid bed further enhances both heat and mass transfer within the fluid-bed reactor, improving both yield and the H/C ratio in the product liquids. The high heat transfer rates and acoustic field radiated by the pulse combustor resonance tubes results in rapid devolatilization and pyrolysis of the oil shale particles. Thus, the process reduces facility capital cost with enhanced liquid product yield and quality. The indirectly heated continuous reactor system will also yield a highly porous and reactive char with low ash content, ideal for combustion applications.

Rapid heating (at rates above 10,000° C. per second) and the presence of steam within the char bed generates nascent hydrogen and CO adjacent to the devolatilizing oil shale particles. This results in the formation of reactive pyrolysis fragments or free radicals which are stabilized by nascent hydrogen as soon as they are formed. The rapid rate of devolatilization and in-situ availability of hydrogen increases the liquid yield with less tendency to polymerize. By preventing polymerization, it is possible to generate large amounts of light condensible hydrocarbons.

The volatile products (consisting of condensibles and non-condensible gases) leave the reactor after separation of the char and sorbent in a cyclone. In the collective system, the vapors are quenched with recycle oil or hydrotreated recycle oil. The non-condensible gases leave the quench scrubber tower for removal of acid gases. The quenched condensible products would include pyrolysis water and light hydrogen oils and tar. A fraction is cooled and recycled back to the quench scrubber.

The invention provides high heat and mass transfer rates in a well-controlled, low-temperature (<600° C.) reactor environment, short residence times, high heating times, and a reactive steam atmosphere at low capital and operating costs.

Indirect Drying

According to another embodiment of this invention, the reactor apparatus is employed for indirect drying of materials and solids. The indirectly heated fluid bed is used to dry slurries and moisture containing solids by vaporization of the moisture content without direct contact with the flue gas. The preferred use within this embodiment is in drying highly reactive low-rank coals produced by coal preparation plants. This is to avoid contact with excess oxygen in the flue gas found in direct dryers, causing the product dry coal to become pyrophoric. This indirect drying process is also necessary for drying coal preparation plant output when solvents are used in the beneficiation process or solvent recoupment is required. The process is also useful in thermal drying of all solids that should not be exposed directly to flue gas or hot air in the drying process.

EXAMPLES

Example 1

Sodium carbonate was fluidized by a mixture of steam and flue gas from a boiler and heated by heat transfer from a resonance tube under the following conditions:

| | |
|---|---|
| Initial Temperature of Sodium Carbonate | 26° C. |
| Size of Sodium Carbonate | 100–1000 microns |
| Fluidizing Velocity of Mixture of Steam and Flue Gas | 3 ft./sec. |
| Temperature of Fluidizing Gas | 200° C. |
| Fuel Fed to the Pulse Combustor | Natural Gas |
| Temperature Inside the Pulse Combustor | 2500–3000° F. |
| Temperature Inside the Resonance Tube | 2000–3000° F. |

Under steady-state conditions of operation of the pulse combustor and fluidized bed, the temperature of the fluidized bed was maintained at 1200° F. At that stage, black liquor was injected into the fluidized bed of sodium carbonate. The black liquor underwent pyrolysis and gasification, yielding solid, liquid and gaseous products. The solid product was deposited on the fluidized sodium carbonate and was withdrawn from the reactor. The vaporized liquid and gaseous products were discharged from the reactor and were then cooled to separate condensed liquid products from the gas. The following results were obtained:

| Analysis of Black Liquor, Wt. % | |
|---|---|
| Solids | 50.6 |
| Water Containing Dissolved Salts | 49.4 |
| Analysis of Black Liquor Solids, Wt. % | |
| Carbon | 38.8 |
| Hydrogen | 3.9 |
| Sulfur | 3.4 |
| Sodium | 18.7 |
| Oxygen | 35.2 |
| Products Obtained, Wt. % of Black Liquor Solids | |
| Tar | 0.5 |
| Gas | 37.5 |
| Salts | 62.0 |
| Analysis of Product Gas, Vol. % | |
| H2 | 54.95 |
| CO | 8.44 |
| $CO_2$ | 19.31 |
| $CH_4$ | 10.04 |
| $C_2$ + Hydrocarbons | 5.03 |
| $H_2S$ | 2.2 |

Example 2

A mixture of sand and wood was fluidized by steam and heated by heat transfer from a resonance tube under the following conditions:

| | |
|---|---|
| Initial Temperature of the Sand and Wood Mixture | 25° C. |
| Size of Sand | 100–200 micron |
| Size of Wood | 100–200 micron |
| Fluidizing Velocity | 1.5 ft/sec |
| Temperature of Fluidizing Steam | 200° C. |
| Fuel Fed to the Pulse Combustor | Wood |
| Temperature Inside the Pulse Combustor | 2600–2800° F. |

| -continued | |
|---|---|
| Gas Temperature Range Inside Resonance Tube from Inlet to Outlet of Resonance Tube | 1000–1800° F. |

Under steady-state conditions of operation of the pulse combustor and fluidized bed, the temperature of the fluidized bed was maintained at about 1100° F. The wood underwent pyrolysis and steam gasification, yielding solid, liquid and gaseous products. The products of the reaction were discharged from the reactor along with excess steam and were then cooled. The following results were obtained:

| Analysis of Wood, Feedstock Wt. % | |
|---|---|
| Carbon | 43.52 |
| Hydrogen | 5.62 |
| Moisture | 7.94 |
| Oxygen | 42.15 |
| Ash | 0.78 |

| Products Obtained, Wt. %: | | |
|---|---|---|
| | 1081° F. | 1216° F. |
| Average Reactor Temperature | | |
| Gas | 89.6 | 95.0 |
| Char | 10.3 | 4.99 |
| Tar | 0.1 | 0.01 |
| Analysis of Product Gas, Vol. % | | |
| H2 | 23.0 | 35.4 |
| CO | 40.5 | 35.5 |
| CO2 | 17.8 | 8.6 |
| CH4 | 14.1 | 13.9 |
| C2 + Hydrocarbons | 4.6 | 6.6 |
| TOTAL | 100.0 | 100.0 |

Example 3

A sulfur-resistant reforming catalyst is fluidized by steam and heated by heat transfer from a resonance tube under the following conditions:

| | |
|---|---|
| Initial Temperature of Catalyst | 26° C. |
| Size of Catalyst | 400–500 microns |
| Temperature of Steam | 200° F. |
| Fluidizing Velocity of Steam | 3 ft./sec. |
| Fuel Fed to the Pulse Combustor | Fuel Oil |
| Temperature Inside the Pulse Combustor | 2500–3000° F. |
| Temperature Inside the Resonance Tube | 2100–1500° F. |

Under steady-state conditions of operation of the pulse combustor and fluidized bed, the temperature of the fluidized bed is maintained at about 1700° F. At that stage, fuel oil is injected into the fluidized bed of the catalyst. The fuel oil undergoes reforming by reaction with steam and produces synthesis gas and a heavy oil. The liquid and gaseous products are discharged form the reactor and are then cooled to separate condensed liquids from the gases. The following results are predicted:

| Analysis of Fuel Oil, Wt. % | |
|---|---|
| IBP | 445 |
| 50% distillation | 551 |
| EBP | 684 |

| Products Obtained | Wt. % of Fuel Oil |
|---|---|
| Gas | 98.6 |
| Liquid | 1.5 |

| Analysis of Product Gas | Vol. % |
|---|---|
| $H_2$ | 54.4 |
| CO | 5.1 |
| $CO_2$ | 21.3 |
| $CH_4$ | 17.5 |
| $C_2$ + Hydrocarbons | 1.7 |

| (FIA) Analysis, | Vol. % |
|---|---|
| Aromatics | 23.2 |
| Olefins | 6.8 |
| Saturates | 70.0 |

Example 4

A mixture of limestone and paper mill waste sludge was fluidized by steam and heated indirectly by heat transfer from a resonance tube under the following conditions:

| | |
|---|---|
| Initial Temperature of Calcium Carbonate and Sludge | 25° C. |
| Size of Calcium Carbonate Bed Material | 700 microns, average |
| Fluidizing Velocity | 1.5 ft./sec |
| Temperature of Fluidizing Steam | 500° C. |
| Fuel Fed to the Pulse Combustor | Natural Gas |
| Temperature Inside the Pulse Combustor | 2200–2400° F. |
| Temperature Inside the Resonance Tubes from Inlet to Outlet of Resonance Tubes | 2400–1300° F. |

Under steady-state conditions of operation of the pulse combustor and fluidized bed, the temperature of the fluidized bed is maintained at 1250° F. The sludge underwent steam gasification, yielding solid, liquid and gaseous products. The following results were obtained:

| Proximate Analysis for Sludge Waste (Wt. %) | |
|---|---|
| Ash | 19.38 |
| Volatile | 66.93 |
| Fixed Carbon | 13.69 |
| TOTAL | 100.00 |
| Heating Value (Btu/lb) | 7124 |
| Products Obtained (Wt. %) | |
| Dry Gas | 91.90 |
| Char | 5.80 |

-continued

| | |
|---|---|
| Tar/Oil | 2.30 |
| TOTAL | 100.00 |
| Heating Value (Btu/scf) | 412 |
| Analysis of Product Gas (Vol. %) | |
| $H_2$ | 38.86 |
| CO | 23.34 |
| $CO_2$ | 23.27 |
| $CH_4$ | 8.13 |
| $C_2$ + Hydrocarbons | 6.40 |
| TOTAL | 100.00 |

Example 5

A subbitumunous coal is fluidized by steam and heated by heat transfer from a resonance tube under the following conditions:

| | |
|---|---|
| Initial Temperature of Coal | 25° C. |
| Size of Coal | 100–200 microns |
| Fluidizing Velocity of Steam | 2 ft./sec |
| Temperature of Steam | 200° F. |
| Fuel Fed to the Pulse Combustor | Coal |
| Temperature Inside the Pulse Combustor | 2600–3000° F. |
| Temperature Inside the Resonance Tube | 2000–1200° F. |

Under steady-state conditions of operation of the pulse combustor and fluidized bed, the temperature of the fluidized bed is maintained at 1150° F. The coal undergoes pyrolysis and gasification, yielding solid, liquid and gaseous products. The products of coal are discharged from the reactor along with excess steam and are then cooled to separate the water therefore. The following results are predicted:

| Typical Analysis of Coal, Wt. % | |
|---|---|
| Carbon | 75.1 |
| Hydrogen | 5.0 |
| Sulfur | 1.0 |
| Nitrogen | 1.4 |
| Oxygen | 4.7 |
| Products, Wt. % | |
| Char | 54.5 |
| Gas | 27.3 |
| Tar & Oil | 18.1 |
| Analysis of Product Gas, Vol. % | |
| $H_2$ | 38.9 |
| CO | 28.5 |
| $CO_2$ | 16.4 |
| $CH_4$ | 13.6 |
| $C_2$ + Hydrocarbons | 1.8 |
| $H_2S + NH_3$ | 0.8 |

Example 6

Oil shale is fluidized by flue gas from an oil-fired pulse combustor and heated by heat transfer from a resonance tube under the following conditions:

| | |
|---|---|
| Initial Temperature of Oil Shale | 26° C. |
| Size of Oil Shale | 100–1000 microns |
| Fluidizing Velocity of Flue Gas | 2 ft./sec |
| Temperature of Flue Gas | 100° F. |
| Fuel Fed to the Pulse Combustor | Natural Gas |
| Temperature Inside the Pulse Combustor | 2500–2900° F. |
| Temperature Inside the Resonance Tube | 1900–1200° F. |

Under steady-state conditions of operation of the pulse combustor and fluidized bed, the temperature of the fluidized bed is maintained at 1200° F. Oil shale feed to the reactor undergoes pyrolysis and yields liquid and gaseous products. The products of oil shale are discharged from the reactor and are then cooled to separate liquid product therefrom. The following results are predicted:

| Analysis of Oil Shale, Wt. % | |
|---|---|
| Kerogen | 22.5 |
| Rock | 77.5 |
| Products Obtained, Wt. % of Oil Shale | |
| Gas | 2.6 |
| Shale Oil | 12.4 |
| Analysis of Product Gas, Vol. % | |
| $H_2$ | 37.6 |
| CO | 42.7 |
| $CO_2$ | 12.2 |
| Hydrocarbons | 6.3 |
| $H_2S + NH_3$ | 1.2 |

Example 7

A pulse combustor integrated indirectly heated fluid-bed dryer was charged with #20 silica sand to act as a ballast media for injected coal slurry. The sand particle size was larger than the particle size of the wet coal. Thus, once the injected coal slurry was sufficiently dried it was elutriated from the bed. Fluidization velocity was approximately 1.4 ft/sec. The bed temperature was well agitated and kept at 270° F. The slurry feed rate was 1.2–1.3 pounds/minute. The dried coal product was collected in a primary collection cyclone with fine particles collected in a baghouse. A heat balance for the indirect dryer when corrected for extraneous losses due to the experimental nature of this test indicated a specific energy consumption of 1600 Btu/lb of water evaporated.

The conditions set forth in each of the foregoing examples are illustrative of various embodiments of the process of this invention employing very high rates of heat transfer with acoustic pressure wave propagation into a reactor bed. The illustrative conditions can be varied in many ways by one skilled in the art. Substitutions, modifications and alterations are permissible without departing from the spirit and scope of the invention as defined in the following claims.

TABLE 1

| | | Stream NO | | | | | | |
|---|---|---|---|---|---|---|---|---|
| | | 38 | 39 | 40 | 41 | 42 | 43 | 44 |
| | | Stream Name | | | | | | |
| Component | MW | BLACK LIQUOR FEED lb/h | STEAM RECYCLE MIXTURE lb/h | PRODUCT GAS lb/h | SOLIDS DRAW OFF lb/h | NET PRODUCT GAS lb/h | PRODUCT GAS lb/h | FUEL GAS TO PULSE COMBUSTOR lb/h |
| O2 | 32.00 | — | — | — | — | — | — | — |
| N2 | 28.01 | — | — | — | — | — | — | — |
| CO | 28.01 | — | 739.10 | 1478.20 | — | 739.10 | 739.10 | 380.60 |
| CO2 | 44.01 | — | 1032.50 | 2065.00 | — | 1032.50 | 1032.50 | 531.70 |
| CH4 | 16.04 | — | 42.70 | 85.00 | — | 42.70 | 42.70 | 22.00 |
| C2H6 | 30.07 | — | 10.70 | 21.40 | — | 10.70 | 10.70 | 5.50 |
| C3H8 | 44.09 | — | 7.80 | 15.60 | — | 7.80 | 7.80 | 4.00 |
| H2 | 2.02 | — | 169.60 | 339.20 | — | 169.60 | 169.60 | 87.30 |
| H2S | 34.09 | — | 73.10 | 146.20 | — | 73.10 | 73.10 | — |
| H2O | 18.02 | 985.00 | 1211.80 | 1223.60 | — | 611.80 | 611.80 | 180.10 |
| C | 12.01 | — | — | — | 34.00 | — | — | — |
| Na2CO3 | 106.00 | — | — | — | 799.10 | — | — | — |
| Na2S | 78.04 | — | — | — | 37.50 | — | — | — |
| Na2SO4 | 142.00 | — | — | — | 9.70 | — | — | — |
| Nacl | 58.45 | — | — | — | 16.50 | — | — | — |
| BLS | — | 2000.00 | — | — | — | — | — | — |
| Total mass (lb/h) | | 2985.00 | 3288.00 | 5375.00 | 897.00 | 2688.00 | 2688.00 | 1211.00 |
| pressure (psig) | | 30.00 | 10.00 | 7.00 | — | 7.00 | 3.00 | 1.00 |
| Temperature (F.) | | 180.00 | 1075.00 | 1200.00 | 1200.00 | 1200.00 | 180.00 | 120.00 |

| | | Stream NO | | | | | | |
|---|---|---|---|---|---|---|---|---|
| | | 45 | 46 | 47 | 48 | 49 | 50 | 51 |
| | | Stream Name | | | | | | |
| Component | MW | COMBUSTIO AIR lb/h | FLUE FROM PULSE COMBUSTOR lb/h | FLUE lb/h | FLUE lb/h | FEED WATER lb/h | PREHEATED FEED WATER lb/h | STEAM lb/h |
| O2 | 32.00 | 1343.00 | 310.00 | 310.00 | 310.00 | — | — | — |
| N2 | 28.01 | 4422.20 | 4422.20 | 4422.20 | 4422.20 | — | — | — |
| CO | 28.01 | — | — | — | — | — | — | — |
| CO2 | 44.01 | — | 1218.20 | 1218.20 | 1218.20 | — | — | — |
| CH4 | 16.04 | — | — | — | — | — | — | — |
| C2H6 | 30.07 | — | — | — | — | — | — | — |
| C3H8 | 44.09 | — | — | — | — | — | — | — |
| H2 | 2.02 | — | — | — | — | — | — | — |
| H2S | 34.09 | — | — | — | — | — | — | — |
| H2O | 18.02 | — | 1026.10 | 1026.10 | 1026.10 | 1222.00 | 1222.00 | 1198.00 |
| C | 12.01 | — | — | — | — | — | — | — |
| Na2CO3 | 106.00 | — | — | — | — | — | — | — |
| Na2S | 78.04 | — | — | — | — | — | — | — |
| Na2SO4 | 142.00 | — | — | — | — | — | — | — |
| Nacl | 58.45 | — | — | — | — | — | — | — |
| BLS | — | — | — | — | — | — | — | — |
| Total mass (lb/h) | | 5765.00 | 6976.00 | 6976.00 | 6976.00 | 1222.00 | 1222.00 | 1198.00 |
| pressure (psig) | | 1.00 | — | — | — | 620.00 | 610.00 | 600.00 |
| Temperature (F.) | | 77.00 | 1300.00 | 680.00 | 300.00 | 77.00 | 470.00 | 490.00 |

| | | Stream NO | | | | | | |
|---|---|---|---|---|---|---|---|---|
| | | 52 | 53 | 54 | 55 | 56 | 57 | 58 |
| | | Stream Name | | | | | | |
| Component | MW | PROCESS STEAM lb/h | EXPORT STEAM lb/h | FEED WATER lb/h | PREHEATED FEED WATER lb/h | EXPORT STEAM lb/h | NET EXPORT STEAM lb/h | EXPORT FUEL GAS lb/h |
| O2 | 32.00 | — | — | — | — | — | — | — |
| N2 | 28.01 | — | — | — | — | — | — | — |
| CO | 28.01 | — | — | — | — | — | — | 358.50 |
| CO2 | 44.01 | — | — | — | — | — | — | 500.80 |
| CH4 | 16.04 | — | — | — | — | — | — | 20.70 |

TABLE 1-continued

| | | | | | | | | |
|---|---|---|---|---|---|---|---|---|
| C2H6 | 30.07 | — | — | — | — | — | — | 5.20 |
| C3H8 | 44.09 | — | — | — | — | — | — | 3.80 |
| H2 | 2.02 | — | — | — | — | — | — | 82.30 |
| H2S | 34.09 | — | — | — | — | — | — | — |
| H2O | 18.02 | 600.00 | 333.00 | 1793.00 | 1793.00 | 1757.00 | 2090.00 | 169.50 |
| C | 12.01 | — | — | — | — | — | — | — |
| Na2CO3 | 106.00 | — | — | — | — | — | — | — |
| Na2S | 78.04 | — | — | — | — | — | — | — |
| Na2SO4 | 142.00 | — | — | — | — | — | — | — |
| Nacl | 58.45 | — | — | — | — | — | — | — |
| BLS | — | — | — | — | — | — | — | — |
| Total mass (lb/h) | | 600.00 | 333.00 | 1793.00 | 1793.00 | 1757.00 | 2090.00 | 1140.80 |
| pressure (psig) | | 600.00 | 600.00 | 620.00 | 610.00 | 600.00 | 600.00 | 1.00 |
| Temperature (F.) | | 490.00 | 490.00 | 77.00 | 470.00 | 490.00 | 490.00 | 120.00 |

We claim:

1. A process for detoxifying toxic waste materials by steam reformation through endothermic gasification reactions, said process comprising the steps of:
   (a) forming a bed of solids in a first reaction vessel having heating conduits therein so as to immerse said conduits in said bed of solids;
   (b) indirectly heating said bed of solids in said first reaction vessel and causing said endothermic gasification reactions by providing heat to said conduits and indirectly transferring said heat from said conduits to said bed of solids;
   (c) injecting steam into said bed of solids to create a fluidized bed of solids;
   (d) depositing said toxic waste materials onto said fluidized bed of solids;
   (e) forming a partially reformed toxic gas in said first reaction vessel through endothermic gasification reactions; and
   (f) transferring said partially reformed toxic gas from said first reaction vessel to a second reaction vessel for further processing.

2. The process of claim 1, wherein said toxic waste materials are hazardous.

3. The process of claim 2, wherein said hazardous toxic waste materials comprise toxic organic materials.

4. The process of claim 1, wherein said toxic waste materials comprise materials chosen from the group consisting of industrial wastes and municipal wastes.

5. The process of claim 1 wherein said indirect heat supplied to said first reaction vessel is created by pulse combustion.

6. A process for detoxifying toxic waste materials by steam reformation through endothermic gasification reactions, said process comprising the steps of:
   (a) forming a bed of solids in a first reaction vessel having heating conduits therein so as to immerse said conduits in said bed of solids;
   (b) indirectly heating said bed of solids in said first reaction vessel and causing said endothermic gasification reactions by providing heat to said conduits and indirectly transferring said heat from said conduits to said bed of solids;
   (c) injecting steam into said bed of solids to create a fluidized bed of solids;
   (d) depositing said toxic waste materials directly onto said fluidized bed of solids;
   (e) forming a partially reformed gas in said first reaction vessel through said endothermic gasification reactions; and
   (f) withdrawing said partially reformed gas from said first reaction vessel.

7. The process of claim 6 wherein said indirect heat provided to said first reaction vessel is created by pulse combustion.

8. A process for detoxifying toxic waste materials by steam reformation through endothermic gasification reactions, said process comprising the steps of:
   (a) forming a bed of solids in a first reaction vessel having a heating source therein;
   (b) indirectly heating said bed of solids in said first reaction vessel and causing said endothermic gasification reactions by indirectly transferring heat from said heat source to said bed of solids;
   (c) injecting steam into said bed of solids to create a fluidized bed of solids;
   (d) depositing said toxic waste materials directly onto said fluidized bed of solids;
   (e) forming a partially reformed gas in said first reaction vessel through said endothermic gasification reactions; and
   (f) withdrawing said partially reformed gas from said first reaction vessel.

9. The process of claim 8 wherein said heat source comprises the resonance tubes of a pulse combustor.

* * * * *

UNITED STATES PATENT AND TRADEMARK OFFICE
CERTIFICATE OF CORRECTION

PATENT NO.   : 6,149,765
DATED        : November 21, 2000
INVENTOR(S)  : Mansour et al.

It is certified that error appears in the above-identified patent and that said Letters Patent is hereby corrected as shown below:

Column 19,
Line 60, please change the formula to read as the following:
-- $Na_2S + H_2O + CO_2$ ---------- $Na_2CO_3 + H_2S$ --

Signed and Sealed this

First Day of April, 2003

JAMES E. ROGAN
*Director of the United States Patent and Trademark Office*